United States Patent
Mao et al.

(10) Patent No.: US 11,202,077 B2
(45) Date of Patent: Dec. 14, 2021

(54) MOTION VECTOR PREDICTION METHOD AND DEVICE

(71) Applicant: Huawei Technologies Co., Ltd., Shenzhen (CN)

(72) Inventors: Jue Mao, Hangzhou (CN); Lu Yu, Hangzhou (CN); Yin Zhao, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/711,718

(22) Filed: Dec. 12, 2019

(65) Prior Publication Data

US 2020/0120344 A1    Apr. 16, 2020

Related U.S. Application Data

(63) Continuation of application No. PCT/CN2018/080125, filed on Mar. 23, 2018.

(30) Foreign Application Priority Data

Jun. 13, 2017 (CN) .......................... 201710445873.7

(51) Int. Cl.
  *H04N 19/139* (2014.01)
  *H04N 19/105* (2014.01)
  (Continued)

(52) U.S. Cl.
  CPC ......... *H04N 19/139* (2014.11); *H04N 19/105* (2014.11); *H04N 19/159* (2014.11); *H04N 19/176* (2014.11)

(58) Field of Classification Search
  CPC ...... H04N 19/58; H04N 19/51; H04N 19/139; H04N 19/521; H04N 19/159; H04N 19/52;
  (Continued)

(56) References Cited

U.S. PATENT DOCUMENTS 9,635,383 B2 * 4/2017 Zhou ...................... H04N 19/52
2006/0018381 A1 1/2006 Luo et al.
(Continued)

FOREIGN PATENT DOCUMENTS

CN 101023676 A 8/2007
CN 101595735 A 12/2009
(Continued)

OTHER PUBLICATIONS

Machine Translation and Abstract of Chinese Publication No. CN103338372, Oct. 2, 2013, 31 pages.
(Continued)

*Primary Examiner* — Neil R Mikeska
(74) *Attorney, Agent, or Firm* — Conley Rose, P.C.

(57) ABSTRACT

A motion vector prediction method and device, includes determining a motion vector type of the motion vector of the current block based on a reference frame type of the reference frame, obtaining a motion vector type of a first motion vector of at least one spatially adjacent prediction block of the current block when the at least one spatially adjacent prediction block is an inter-frame prediction block, and when the obtained motion vector type of the first motion vector is different from all motion vector types of motion vectors of the current block, determining a second motion vector of a spatially adjacent pixel block of the current block based on decoding information of the spatially adjacent pixel block, and using the second motion vector or a scaling value of the second motion vector as a candidate motion vector predictor of the current block.

20 Claims, 9 Drawing Sheets

Co-located block

Current block

(51) Int. Cl.
*H04N 19/159* (2014.01)
*H04N 19/176* (2014.01)

(58) Field of Classification Search
CPC .. H04N 19/105; H04N 19/176; H04N 19/577; H04N 19/172; H04N 19/513
See application file for complete search history.

(56) References Cited

U.S. PATENT DOCUMENTS

| | | | |
|---|---|---|---|
| 2008/0181309 A1 | 7/2008 | Lee et al. | |
| 2010/0208814 A1 | 8/2010 | Xiong et al. | |
| 2010/0246680 A1* | 9/2010 | Tian | H04N 19/573 375/240.16 |
| 2010/0266042 A1* | 10/2010 | Koo | H04N 19/70 375/240.16 |
| 2011/0080954 A1 | 4/2011 | Bossen et al. | |
| 2012/0269271 A1 | 10/2012 | Chen et al. | |
| 2013/0107963 A1 | 5/2013 | Wahadaniah et al. | |
| 2013/0243081 A1 | 9/2013 | Chen et al. | |
| 2013/0243093 A1 | 9/2013 | Chen et al. | |
| 2013/0336407 A1 | 12/2013 | Chen et al. | |
| 2013/0343459 A1 | 12/2013 | Bici et al. | |
| 2014/0016701 A1 | 1/2014 | Chen et al. | |
| 2014/0086324 A1 | 3/2014 | Ramasubramonian et al. | |
| 2014/0307783 A1* | 10/2014 | Kim | H04N 19/52 375/240.03 |
| 2014/0307799 A1* | 10/2014 | Oh | H04N 19/126 375/240.16 |
| 2015/0103912 A1 | 4/2015 | Lee et al. | |
| 2015/0195573 A1* | 7/2015 | Beni | H04N 19/513 375/240.16 |
| 2015/0271487 A1* | 9/2015 | Li | H04N 19/52 375/240.02 |
| 2015/0271489 A1* | 9/2015 | Sugio | H04N 19/52 375/240.16 |
| 2016/0261873 A1 | 9/2016 | Abe et al. | |
| 2016/0295211 A1* | 10/2016 | Sato | H04N 19/33 |
| 2016/0295226 A1 | 10/2016 | Lim et al. | |
| 2017/0105005 A1* | 4/2017 | Chen | H04N 19/159 |
| 2017/0289566 A1* | 10/2017 | He | H04N 19/52 |
| 2017/0310976 A1 | 10/2017 | Na et al. | |
| 2017/0332099 A1* | 11/2017 | Lee | H04N 19/52 |
| 2019/0082184 A1* | 3/2019 | Hannuksela | H04N 19/159 |

FOREIGN PATENT DOCUMENTS

| | | |
|---|---|---|
| CN | 103152562 A | 6/2013 |
| CN | 103338372 A | 10/2013 |
| CN | 103348679 A | 10/2013 |
| CN | 103503460 A | 1/2014 |
| CN | 104170381 A | 11/2014 |
| CN | 104243982 A | 12/2014 |
| CN | 104272743 A | 1/2015 |
| CN | 104322070 A | 1/2015 |
| CN | 104584549 A | 4/2015 |
| CN | 104662920 A | 5/2015 |
| CN | 104838656 A | 8/2015 |
| CN | 106717005 A | 5/2017 |
| CN | 106817585 A | 6/2017 |
| JP | 2011501542 A | 1/2011 |
| KR | 20080070976 A | 8/2008 |
| WO | 2011041321 A1 | 4/2011 |
| WO | 2013061551 A1 | 5/2013 |
| WO | 2016160608 A1 | 10/2016 |

OTHER PUBLICATIONS

Kamp, S., et al. "Decoder Side Motion Vector Derivation for Inter Frame Video Coding," ICIP 2008, pp. 1120-1123.

Quacchio, E., et al. "Enhancing whole-frame error concealment with an intra motion vector estimator in H.264/AVC," Proceedings (ICASSP "05), IEEE International Conference on Acoustics, Speech, and Signal Processing, 2005, pp. 329-332.

Foreign Communication From A Counterpart Application, PCT Application No. PCT/CN2018/080125, English Translation of International Search Report dated Jun. 13, 2018, 2 pages.

Foreign Communication From A Counterpart Application, PCT Application No. PCT/CN2018/080125, English Translation of Written Opinion dated Jun. 13, 2018, 5 pages.

Xi Yinglai, "Research of the Key Algorithms of H.264/AVC Encoder and Its VLSI Design," Northwestern Polytechnical University , Signal and Information Processing, PhD, Northwestern Polytechnical University [Web publishing period] Apr. 2008, 166 pages. With English Abstract.

Takahashi, Y., et al., "High-level Syntax: Motion vector prediction issue for long-term reference picture," Joint Collaborative Team on Video Coding (JCT-VC) of ITU-T SG 16 WP 3 and ISO/IEC JTC 1/SC 29/WG 11, JCTVC-J0071, XP030112433, 10th Meeting: Stockholm, SE, Jul. 11-20, 2012, 6 pages.

Mao, J., et al., "Complementary Motion Vector for Motion Prediction in Video Coding with Long-Term Reference," XP033688148, Picture Coding Symposium (PCS), IEEE, Nov. 12, 2019, 5 pages.

Robert, A., et al., "High precision FRUC with additional candidates," Joint Video Exploration Team (JVET) of ITU-T SG 16 WP 3 and ISO/IEC JTC 1/SC 29/WG 11, 4th Meeting: Chengdu, CN, Oct. 15-21, 2016, JVET-D0046, 7 pages.

\* cited by examiner

MOTION VECTOR PREDICTION METHOD AND DEVICE

CROSS-REFERENCE TO RELATED APPLICATIONS

This application is a continuation application of International Patent Application No. PCT/CN2018/080125, filed on Mar. 23, 2018, which claims priority to Chinese Patent Application No. 201710445873.7, filed on Jun. 13, 2017. The disclosures of the aforementioned applications are hereby incorporated by reference in their entireties.

TECHNICAL FIELD

This application relates to the field of picture processing technologies, and in particular, to a motion vector prediction method and device.

BACKGROUND

A motion vector (MV) predictive coding technology is used for inter-frame coding in a high efficiency video coding (HEVC) standard, to reduce a data amount in MV-related information transmission and improve coding efficiency. Inter-frame predictive coding in the HEVC standard is divided into two modes an inter-frame mode and a merge/skip mode. When the inter mode is used for a current block, a reference frame index, a motion vector predictor index (MVP index), and a motion vector difference (MVD) that are of an MV of the current block are identified in a bitstream. A reference frame to which the MV of the current block points is determined based on the reference frame index, the MVP index indicates that a candidate in a MVP candidate list is used as a predictor of the MV of the current block, and the MV of the current block is obtained by adding the MVP to the MVD. When the merge/skip mode is used for a current block, neither of a MVD and a reference frame index is identified in a bitstream, and only an MVP index is identified. A corresponding MV and a reference frame corresponding to the MV are selected from an MVP candidate list based on the MVP index, and are used as an MV of the current block and a reference frame corresponding to the MV of the current block.

In the two solutions, a MVP list needs to be constructed using MVs of a spatially adjacent block and a temporally adjacent block that are of the current block. Each of the MVs is referred to as an MVP candidate. Then, a corresponding MVP candidate is found from the MVP list based on the MVP index transmitted in the bitstream, and the corresponding MVP candidate is determined as a MVP of the current block. Inter-frame prediction may be performed on a current block in the inter mode through any one of forward prediction, backward prediction, and bidirectional prediction. Any block in the inter mode has one or two MVs, and an MVP list needs to be constructed for each MV in the block.

When unidirectional prediction is performed on each spatially adjacent block or temporally adjacent block of the current block, the spatially adjacent block or temporally adjacent block contains only one MV. When bidirectional prediction is performed on the current block, two contained MVs may be of a same type. In the inter mode, if a type of an MV of an adjacent block is different from a type of the MV of the current block (in an embodiment, one MV is a long-term motion vector (LMV) and the other MV is a short-term motion vector (SMV)), the MV of the adjacent block is not added to the MVP list. Consequently, a quantity of zero motion vectors (Zero MV) in the MVP list increases, resulting in low MV prediction efficiency.

SUMMARY

Embodiments of this application provide a motion vector prediction method. When a motion vector type of a motion vector of a current block is different from a motion vector type of a motion vector of an adjacent block, the method is used to supplement a MVP list of the current block with a motion vector having a same motion vector type as the motion vector of the current block, to enrich the MVP list and improve motion vector prediction efficiency.

A first aspect of the embodiments of this application provides a motion vector prediction method, including obtaining, by a device from a bitstream, a reference frame corresponding to a motion vector of a current block, then determining, by the device, a reference frame type of the reference frame, and determining a motion vector type of the motion vector of the current block based on the reference frame type of the reference frame, where the reference frame type of the reference frame includes a long-term reference frame or a short-term reference frame, the motion vector type of the motion vector of the current block includes a LMV or a SMV, the SMV is obtained from the short-term reference frame, and the LMV is obtained from the long-term reference frame, when at least one spatially adjacent prediction block of the current block is an inter-frame prediction block, obtaining, by the device, a motion vector type of a first motion vector of the at least one spatially adjacent prediction block from the first motion vector used to perform inter-frame prediction on the spatially adjacent prediction block, and when the obtained motion vector type of the first motion vector is different from all motion vector types of motion vectors of the current block, determining, by the device, a second motion vector of a spatially adjacent pixel block of the current block based on decoding information of the spatially adjacent pixel block, and using the second motion vector or a scaling value of the second motion vector as a candidate MVP of the current block. In this embodiment of this application, when the motion vector type of the motion vector of the current block is different from a motion vector type of a first motion vector of an adjacent block, the MVP of the current block is determined, that is, a MVP list of the current block is supplemented with the second motion vector having a same motion vector type as the motion vector of the current block, to enrich the MVP list and improve motion vector prediction efficiency.

In a possible design, in a first implementation of the first aspect of this embodiment of this application, the method further includes using the at least one first motion vector as a candidate MVP of the current block when the obtained motion vector type of the at least one first motion vector is the same as the motion vector type of the motion vector of the current block. In this embodiment of this application, the at least one first motion vector is determined as the MVP of the current block when the obtained motion vector type of the at least one first motion vector is the same as the motion vector type of the motion vector of the current block. This adds an implementation of this embodiment of this application.

In a possible design, in a second implementation of the first aspect of this embodiment of this application, the method further includes, when all spatially adjacent prediction blocks of the current block are intra-frame prediction blocks, determining, by the device in a virtual reference frame of at least one of the spatially adjacent prediction blocks, a virtual reference block having a slightest pixel difference from the spatially adjacent prediction block, where a reference frame type of the virtual reference frame is the same as the reference frame type of the reference frame corresponding to the motion vector of the current block, and the virtual reference frame is a reconstructed frame, and using a motion vector between the virtual reference block and the spatially adjacent prediction block as a MVP of the current block. In this embodiment of this application, when all the spatially adjacent prediction blocks of the current block are intra-frame prediction blocks, a process in which the device determines the MVP adds an implementation of this embodiment of this application.

In a possible design, in a third implementation of the first aspect of this embodiment of this application, the spatially adjacent pixel block of the current block includes at least one pixel block that is spatially adjacent to the current block and that is within a preset range, correspondingly, the decoding information of the spatially adjacent pixel block of the current block includes a pixel reconstruction value of the at least one pixel block that is spatially adjacent to the current block and that is within the preset range, and correspondingly, the determining a second motion vector of a spatially adjacent pixel block of the current block based on decoding information of the spatially adjacent pixel block, and using the second motion vector or a scaling value of the second motion vector as a candidate MVP of the current block includes determining, by the device in a first reference frame of the spatially adjacent pixel block, a first reference block having a slightest pixel difference from the spatially adjacent pixel block, where a reference frame type of the first reference frame is the same as the reference frame type of the reference frame corresponding to the motion vector of the current block, using a motion vector between the first reference block and the pixel block as the second motion vector, and further using the second motion vector or the scaling value of the second motion vector as the candidate MVP of the current block. In this embodiment of this application, a process of determining the MVP based on the pixel block is described such that this embodiment of this application is more operable.

In a possible design, in a fourth implementation of the first aspect of this embodiment of this application, the determining, by the device in a first reference frame of the spatially adjacent pixel block, a first reference block having a slightest pixel difference from the spatially adjacent pixel block, using a motion vector between the first reference block and the pixel block as the second motion vector, and further using the second motion vector as the candidate MVP of the current block includes, when a first motion vector of a spatially adjacent prediction block at a left preset location relative to the current block has a different motion vector type from the motion vector of the current block, and a first motion vector of a spatially adjacent prediction block at an upper preset location relative to the current block has a different motion vector type from the motion vector of the current block, determining, in the first reference frame of the spatially adjacent pixel block, the first reference block having the slightest pixel difference from the spatially adjacent pixel block, using the motion vector between the first reference block and the spatially adjacent pixel block as the second motion vector, where the reference frame type of the first reference frame is the same as the reference frame type of the reference frame corresponding to the motion vector of the current block, and using the second motion vector or the scaling value of the second motion vector as the candidate MVP of the current block. In this embodiment of this application, a specific process of determining the MVP based on the pixel block is provided such that this embodiment of this application is more operable and executable.

In a possible design, in a fifth implementation of the first aspect of this embodiment of this application, the spatially adjacent pixel block of the current block includes at least one spatially adjacent prediction block of the current block, correspondingly, the decoding information of the spatially adjacent pixel block of the current block includes a second motion vector of the at least one spatially adjacent prediction block of the current block, a motion vector type of the second motion vector is different from the motion vector type of the first motion vector, and correspondingly, the determining a second motion vector of a spatially adjacent pixel block of the current block based on decoding information of the spatially adjacent pixel block, and using the second motion vector or a scaling value of the second motion vector as a candidate MVP of the current block includes using the second motion vector of the at least one spatially adjacent prediction block or a scaling value of the second motion vector of the at least one spatially adjacent prediction block as the candidate MVP of the current block. In this embodiment of this application, a process of determining the MVP based on the spatially adjacent prediction block is described such that this embodiment of this application is more operable.

In a possible design, in a sixth implementation of the first aspect of this embodiment of this application, the using the second motion vector of the at least one spatially adjacent prediction block or a scaling value of the second motion vector of the at least one spatially adjacent prediction block as the candidate MVP of the current block includes, when a first motion vector of a spatially adjacent prediction block at a left preset location relative to the current block has a different motion vector type from the motion vector of the current block, and at least one second motion vector of the spatially adjacent prediction block at the left preset location is available, using the at least one second motion vector of the spatially adjacent prediction block at the left preset location or a scaling value of the at least one second motion vector of the spatially adjacent prediction block at the left preset location as the candidate MVP of the current block, and when a first motion vector of a spatially adjacent prediction block at an upper preset location relative to the current block has a different motion vector type from the motion vector of the current block, and at least one second motion vector of the spatially adjacent prediction block at the upper preset location is available, using the at least one second motion vector of the spatially adjacent prediction block at the upper preset location or a scaling value of the at least one second motion vector of the spatially adjacent prediction block at the upper preset location as the candidate MVP of the current block. In this embodiment of this application, a specific process of determining the MVP based on the spatially adjacent prediction block is provided such that this embodiment of this application is more operable and executable.

In a possible design, in a seventh implementation of the first aspect of this embodiment of this application, the using the second motion vector of the at least one spatially adjacent prediction block or a scaling value of the second motion vector of the at least one spatially adjacent prediction block as the candidate MVP of the current block includes, if a first motion vector of a spatially adjacent prediction block at a left preset location relative to the current block has a different motion vector type from the motion vector of the current block, and a first motion vector of a spatially adjacent prediction block at an upper preset location relative to the current block has a different motion vector type from the motion vector of the current block, when at least one second motion vector of the spatially adjacent prediction block at the left preset location relative to the current block is available, using the at least one second motion vector of the spatially adjacent prediction block at the left preset location or a scaling value of the second motion vector as the candidate MVP of the current block, or when at least one second motion vector of the spatially adjacent prediction block at the upper preset location relative to the current block is available, using the at least one second motion vector of the spatially adjacent prediction block at the upper preset location or a scaling value of the second motion vector as the candidate MVP of the current block. In this embodiment of this application, another specific process of determining the MVP based on the spatially adjacent prediction block is provided such that this embodiment of this application is more operable and executable.

In a possible design, in an eighth implementation of the first aspect of this embodiment of this application, the method further includes, when a quantity of candidate MVPs is less than a preset value, at least one first motion vector of a co-located block of the current block is available, and a motion vector type of the at least one first motion vector of the co-located block of the current block is the same as the motion vector type of the motion vector of the current block, using the at least one first motion vector of the co-located block or a scaling value of the at least one first motion vector of the co-located block as a candidate MVP. In this embodiment of this application, when the quantity of candidate MVPs is less than the preset value, the first motion vector of the co-located block is used as the MVP of the current block. This adds an implementation of this embodiment of this application.

In a possible design, in a ninth implementation of the first aspect of this embodiment of this application, after the using the at least one first motion vector of the co-located block or a scaling value of the at least one first motion vector of the co-located block as a candidate MVP, the method further includes, when the quantity of candidate MVPs is less than the preset value, using at least one zero motion vector as a candidate MVP such that the quantity of candidate MVPs reaches the preset value. In this embodiment of this application, when the quantity of candidate MVPs is less than the preset value, the zero motion vector is used as the MVP of the current block. This adds an implementation of this embodiment of this application.

In a possible design, in a tenth implementation of the first aspect of this embodiment of the present application, the method may be used in a coding method for the current block or a decoding method for the current block.

A second aspect of the embodiments of this application provides a motion vector prediction device, including a first obtaining unit configured to obtain a reference frame corresponding to a motion vector of a current block, a determining unit configured to determine a motion vector type of the motion vector of the current block based on a reference frame type of the reference frame, where the motion vector type includes a SMV or a LMV, the SMV is obtained from a short-term reference frame, and the LMV is obtained from a long-term reference frame, a second obtaining unit configured to obtain a motion vector type of a first motion vector of at least one spatially adjacent prediction block of the current block when the at least one spatially adjacent prediction block is an inter-frame prediction block, where the first motion vector is used to perform inter-frame prediction on the spatially adjacent prediction block, and a first processing unit configured to, when the obtained motion vector type of the first motion vector is different from all motion vector types of motion vectors of the current block, determine a second motion vector of a spatially adjacent pixel block of the current block based on decoding information of the spatially adjacent pixel block, and use the second motion vector or a scaling value of the second motion vector as a candidate MVP of the current block. In this embodiment of this application, when the motion vector type of the motion vector of the current block is different from a motion vector type of a first motion vector of an adjacent block, the MVP of the current block is determined, that is, a MVP list of the current block is supplemented with the second motion vector having a same motion vector type as the motion vector of the current block, to enrich the MVP list and improve motion vector prediction efficiency.

In a possible design, in a first implementation of the second aspect of this embodiment of this application, the device further includes a second processing unit configured to use the at least one first motion vector as a candidate MVP of the current block when the obtained motion vector type of the at least one first motion vector is the same as the motion vector type of the motion vector of the current block. In this embodiment of this application, the at least one first motion vector is determined as the MVP of the current block when the obtained motion vector type of the at least one first motion vector is the same as the motion vector type of the motion vector of the current block. This adds an implementation of this embodiment of this application.

In a possible design, in a second implementation of the second aspect of this embodiment of this application, the device further includes a third processing unit configured to, when all spatially adjacent prediction blocks of the current block are intra-frame prediction blocks, determine, in a virtual reference frame of at least one of the spatially adjacent prediction blocks, a virtual reference block having a slightest pixel difference from the spatially adjacent prediction block, and use a motion vector between the virtual reference block and the spatially adjacent prediction block as a MVP of the current block, where a reference frame type of the virtual reference frame is the same as the reference frame type of the reference frame corresponding to the motion vector of the current block, and the virtual reference frame is a reconstructed frame. In this embodiment of this application, when all the spatially adjacent prediction blocks of the current block are intra-frame prediction blocks, a process in which the device determines the MVP adds an implementation of this embodiment of this application.

In a possible design, in a third implementation of the second aspect of this embodiment of this application, the spatially adjacent pixel block of the current block includes at least one pixel block that is spatially adjacent to the current block and that is within a preset range, correspondingly, the decoding information of the spatially adjacent pixel block of the current block includes a pixel reconstruction value of the at least one pixel block that is spatially adjacent to the current block and that is within the preset range, and correspondingly, the first processing unit includes a first processing module configured to determine, in a first reference frame of the spatially adjacent pixel block, a first reference block having a slightest pixel difference from the spatially adjacent pixel block, use a motion vector between the first reference block and the spatially adjacent pixel block as the second motion vector, where a reference frame type of the first reference frame is the same as the reference frame type of the reference frame corresponding to the motion vector of the current block, and use the second motion vector or the scaling value of the second motion vector as the candidate MVP of the current block. In this embodiment of this application, a process of determining the MVP based on the pixel block is described such that this embodiment of this application is more operable.

In a possible design, in a fourth implementation of the second aspect of this embodiment of this application, the first processing module includes a first processing submodule configured to, when a first motion vector of a spatially adjacent prediction block at a left preset location relative to the current block has a different motion vector type from the motion vector of the current block, and a first motion vector of a spatially adjacent prediction block at an upper preset location relative to the current block has a different motion vector type from the motion vector of the current block, determine, in the first reference frame of the spatially adjacent pixel block, the first reference block having the slightest pixel difference from the spatially adjacent pixel block, use the motion vector between the first reference block and the spatially adjacent pixel block as the second motion vector, where the reference frame type of the first reference frame is the same as the reference frame type of the reference frame corresponding to the motion vector of the current block, and use the second motion vector or the scaling value of the second motion vector as the candidate MVP of the current block. In this embodiment of this application, a specific process of determining the MVP based on the pixel block is provided such that this embodiment of this application is more operable and executable.

In a possible design, in a fifth implementation of the second aspect of this embodiment of this application, the spatially adjacent pixel block of the current block includes at least one spatially adjacent prediction block of the current block, correspondingly, the decoding information of the spatially adjacent pixel block of the current block includes a second motion vector of the at least one spatially adjacent prediction block of the current block, a motion vector type of the second motion vector is different from the motion vector type of the first motion vector, and correspondingly, the first processing unit includes: a second processing module configured to use the second motion vector of the at least one spatially adjacent prediction block or a scaling value of the second motion vector of the at least one spatially adjacent prediction block as the candidate MVP of the current block. In this embodiment of this application, a process of determining the MVP based on the spatially adjacent prediction block is described such that this embodiment of this application is more operable.

In a possible design, in a sixth implementation of the second aspect of this embodiment of this application, the second processing module includes a second processing submodule configured to, when a first motion vector of a spatially adjacent prediction block at a left preset location relative to the current block has a different motion vector type from the motion vector of the current block, and at least one second motion vector of the spatially adjacent prediction block at the left preset location is available, use the at least one second motion vector of the spatially adjacent prediction block at the left preset location or a scaling value of the at least one second motion vector of the spatially adjacent prediction block at the left preset location as the candidate MVP of the current block, and a third processing submodule configured to, when a first motion vector of a spatially adjacent prediction block at an upper preset location relative to the current block has a different motion vector type from the motion vector of the current block, and at least one second motion vector of the spatially adjacent prediction block at the upper preset location is available, use the at least one second motion vector of the spatially adjacent prediction block at the upper preset location or a scaling value of the at least one second motion vector of the spatially adjacent prediction block at the upper preset location as the candidate MVP of the current block. In this embodiment of this application, a specific process of determining the MVP based on the spatially adjacent prediction block is provided such that this embodiment of this application is more operable and executable.

In a possible design, in a seventh implementation of the second aspect of this embodiment of this application, the second processing module includes a fourth processing submodule configured to, if a first motion vector of a spatially adjacent prediction block at a left preset location relative to the current block has a different motion vector type from the motion vector of the current block, and a first motion vector of a spatially adjacent prediction block at an upper preset location relative to the current block has a different motion vector type from the motion vector of the current block, when at least one second motion vector of the spatially adjacent prediction block at the left preset location relative to the current block is available, use the at least one second motion vector of the spatially adjacent prediction block at the left preset location or a scaling value of the second motion vector as the candidate MVP of the current block, or when at least one second motion vector of the spatially adjacent prediction block at the upper preset location relative to the current block is available, use the at least one second motion vector of the spatially adjacent prediction block at the upper preset location or a scaling value of the second motion vector as the candidate MVP of the current block. In this embodiment of this application, another specific process of determining the MVP based on the spatially adjacent prediction block is provided such that this embodiment of this application is more operable and executable.

In a possible design, in an eighth implementation of the second aspect of this embodiment of this application, the device further includes a fourth processing unit configured to, when a quantity of candidate MVPs is less than a preset value, at least one first motion vector of a co-located block of the current block is available, and a motion vector type of the at least one first motion vector of the co-located block of the current block is the same as the motion vector type of the motion vector of the current block, use the at least one first motion vector of the co-located block or a scaling value of the at least one first motion vector of the co-located block as a candidate MVP. In this embodiment of this application, when the quantity of candidate MVPs is less than the preset value, the first motion vector of the co-located block is used as the MVP of the current block. This adds an implementation of this embodiment of this application.

In a possible design, in a ninth implementation of the second aspect of this embodiment of this application, the device further includes a fifth processing unit configured to, when the quantity of candidate MVPs is less than the preset value, use at least one zero motion vector as a candidate MVP such that the quantity of candidate MVPs reaches the preset value. In this embodiment of this application, when the quantity of candidate MVPs is less than the preset value, the zero motion vector is used as the MVP of the current block. This adds an implementation of this embodiment of this application.

In a possible design, in a tenth implementation of the second aspect of this embodiment of the present application, the device may be used in an encoder for coding the current block or a decoder for decoding the current block.

A third aspect of this application provides a motion vector prediction device, and the device includes a processor and a memory coupled to the processor, where the processor is configured to obtain a reference frame corresponding to a motion vector of a current block, determine a motion vector type of the motion vector of the current block based on a reference frame type of the reference frame, where the motion vector type includes a SMV or a LMV, the SMV is obtained from a short-term reference frame, and the LMV is obtained from a long-term reference frame, obtain a motion vector type of a first motion vector of at least one spatially adjacent prediction block of the current block when the at least one spatially adjacent prediction block is an inter-frame prediction block, where the first motion vector is used to perform inter-frame prediction on the spatially adjacent prediction block, and when the obtained motion vector type of the first motion vector is different from all motion vector types of motion vectors of the current block, determine a second motion vector of a spatially adjacent pixel block of the current block based on decoding information of the spatially adjacent pixel block, and use the second motion vector or a scaling value of the second motion vector as a candidate MVP of the current block.

In a possible design, in a first implementation of the third aspect of this embodiment of this application, the processor is further configured to use the at least one first motion vector as a candidate MVP of the current block when the obtained motion vector type of the at least one first motion vector is the same as the motion vector type of the motion vector of the current block.

In a possible design, in a second implementation of the third aspect of this embodiment of this application, the processor is further configured to, when all spatially adjacent prediction blocks of the current block are intra-frame prediction blocks, determine, in a virtual reference frame of at least one of the spatially adjacent prediction blocks, a virtual reference block having a slightest pixel difference from the spatially adjacent prediction block, and use a motion vector between the virtual reference block and the spatially adjacent prediction block as a MVP of the current block, where a reference frame type of the virtual reference frame is the same as the reference frame type of the reference frame corresponding to the motion vector of the current block, and the virtual reference frame is a reconstructed frame.

In a possible design, in a third implementation of the third aspect of this embodiment of this application, the spatially adjacent pixel block of the current block includes at least one pixel block that is spatially adjacent to the current block and that is within a preset range, correspondingly, the decoding information of the spatially adjacent pixel block of the current block includes a pixel reconstruction value of the at least one pixel block that is spatially adjacent to the current block and that is within the preset range, and correspondingly, the processor is configured to determine, in a first reference frame of the spatially adjacent pixel block, a first reference block having a slightest pixel difference from the spatially adjacent pixel block, use a motion vector between the first reference block and the spatially adjacent pixel block as the second motion vector, where a reference frame type of the first reference frame is the same as the reference frame type of the reference frame corresponding to the motion vector of the current block, and use the second motion vector or the scaling value of the second motion vector as the candidate MVP of the current block.

In a possible design, in a fourth implementation of the third aspect of this embodiment of this application, the processor is configured to, when a first motion vector of a spatially adjacent prediction block at a left preset location relative to the current block has a different motion vector type from the motion vector of the current block, and a first motion vector of a spatially adjacent prediction block at an upper preset location relative to the current block has a different motion vector type from the motion vector of the current block, determine, in the first reference frame of the spatially adjacent pixel block, the first reference block having the slightest pixel difference from the spatially adjacent pixel block, use the motion vector between the first reference block and the spatially adjacent pixel block as the second motion vector, where the reference frame type of the first reference frame is the same as the reference frame type of the reference frame corresponding to the motion vector of the current block, and use the second motion vector or the scaling value of the second motion vector as the candidate MVP of the current block.

In a possible design, in a fifth implementation of the third aspect of this embodiment of this application, the spatially adjacent pixel block of the current block includes at least one spatially adjacent prediction block of the current block, correspondingly, the decoding information of the spatially adjacent pixel block of the current block includes a second motion vector of the at least one spatially adjacent prediction block of the current block, a motion vector type of the second motion vector is different from the motion vector type of the first motion vector, and correspondingly, the processor is configured to use the second motion vector of the at least one spatially adjacent prediction block or a scaling value of the second motion vector of the at least one spatially adjacent prediction block as the candidate MVP of the current block.

In a possible design, in a sixth implementation of the third aspect of this embodiment of this application, the processor is configured to, when a first motion vector of a spatially adjacent prediction block at a left preset location relative to the current block has a different motion vector type from the motion vector of the current block, and at least one second motion vector of the spatially adjacent prediction block at the left preset location is available, use the at least one second motion vector of the spatially adjacent prediction block at the left preset location or a scaling value of the at least one second motion vector of the spatially adjacent prediction block at the left preset location as the candidate MVP of the current block, and when a first motion vector of a spatially adjacent prediction block at an upper preset location relative to the current block has a different motion vector type from the motion vector of the current block, and at least one second motion vector of the spatially adjacent prediction block at the upper preset location is available, use the at least one second motion vector of the spatially adjacent prediction block at the upper preset location or a scaling value of the at least one second motion vector of the spatially adjacent prediction block at the upper preset location as the candidate MVP of the current block.

In a possible design, in a seventh implementation of the third aspect of this embodiment of this application, the processor is configured to, if a first motion vector of a spatially adjacent prediction block at a left preset location relative to the current block has a different motion vector type from the motion vector of the current block, and a first motion vector of a spatially adjacent prediction block at an upper preset location relative to the current block has a different motion vector type from the motion vector of the current block, when at least one second motion vector of the spatially adjacent prediction block at the left preset location relative to the current block is available, use the at least one second motion vector of the spatially adjacent prediction block at the left preset location or a scaling value of the second motion vector as the candidate MVP of the current block, or when at least one second motion vector of the spatially adjacent prediction block at the upper preset location relative to the current block is available, use the at least one second motion vector of the spatially adjacent prediction block at the upper preset location or a scaling value of the second motion vector as the candidate MVP of the current block.

In a possible design, in an eighth implementation of the third aspect of this embodiment of this application, the device may be used in an encoder for coding the current block or a decoder for decoding the current block.

A fourth aspect of this application provides a computer-readable storage medium. The computer-readable storage medium stores an instruction. When the instruction is run on a computer, the computer is enabled to perform the method in the foregoing aspects.

A fifth aspect of this application provides a computer program product including an instruction. When the computer program product is run on a computer, the computer is enabled to perform the method in the foregoing aspects.

It can be learned from the foregoing technical solutions that, the embodiments of this application have the following advantages.

In the technical solutions provided in the embodiments of this application, the reference frame corresponding to the motion vector of the current block is obtained, the motion vector type of the motion vector of the current block is determined based on the reference frame type of the reference frame, where the motion vector type includes the SMV or the LMV, the SMV is obtained from the short-term reference frame, and the LMV is obtained from the long-term reference frame, the motion vector type of the first motion vector of the at least one spatially adjacent prediction block of the current block is obtained when the at least one spatially adjacent prediction block is the inter-frame prediction block, where the first motion vector is used to perform inter-frame prediction on the spatially adjacent prediction block, and when the obtained motion vector type of the first motion vector is different from all the motion vector types of the motion vectors of the current block, the second motion vector of the spatially adjacent pixel block of the current block is determined based on the decoding information of the spatially adjacent pixel block, and the second motion vector or the scaling value of the second motion vector is used as the candidate MVP of the current block. In the embodiments of this application, the MVP list is enriched, and a problem that a MVP cannot be obtained from an adjacent block when a type of a motion vector of the adjacent block is different from the type of the motion vector of the current block is resolved such that motion vector prediction efficiency is improved.

DESCRIPTION OF EMBODIMENTS

Embodiments of this application provide a motion vector prediction method. When a motion vector type of a motion vector of a current block is different from a motion vector type of a motion vector of an adjacent block, the method is used to supplement a MVP list of the current block with a motion vector having a same motion vector type as the motion vector of the current block, to enrich the MVP list and improve motion vector prediction efficiency.

To make persons skilled in the art understand solutions in this application better, the following describes the embodiments of this application with reference to the accompanying drawings in the embodiments of this application.

In the specification, claims, and accompanying drawings of this application, the terms "first", "second", "third", "fourth", and the like (if existent) are intended to distinguish between similar objects but do not necessarily indicate a specific order or sequence. It should be understood that the data used in such a way is interchangeable in proper circumstances such that the embodiments described herein can be implemented in other orders than the order illustrated or described herein. In addition, the terms "include", "have", and any variants thereof are intended to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

Figure 1:
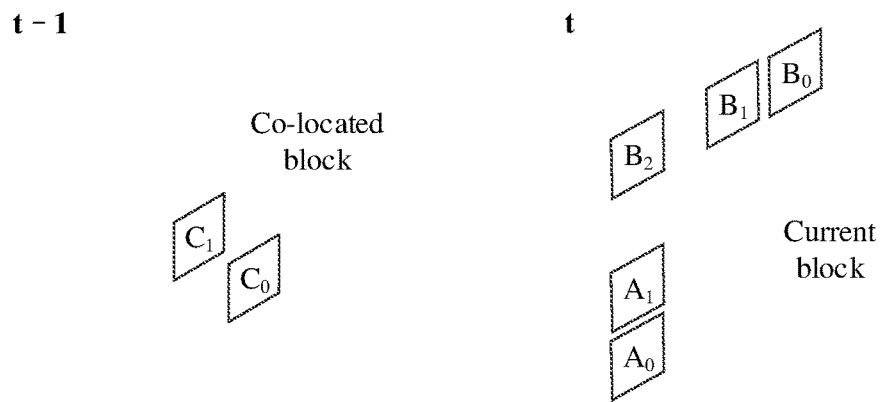
FIG. 1 is a schematic diagram of a system framework to which an embodiment of this application is applied.
Figure 2:
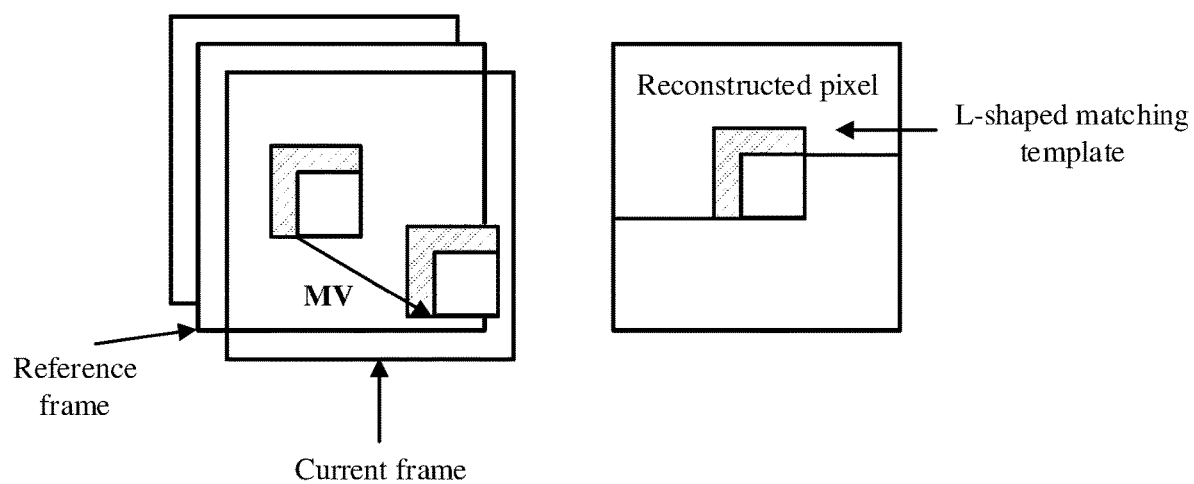
FIG. 2 is a schematic diagram of a reconstructed pixel in an adjacent L-shaped area according to an embodiment of this application.

The method provided in the embodiments of this application may be applied to a system framework shown in FIG. 1. In the system framework, a MVP is determined based on a spatially adjacent prediction block of a current block and a co-located block of the current block. Spatially adjacent prediction blocks of the current block may be classified into a left spatially adjacent prediction block and an upper spatially adjacent prediction block. The spatially adjacent prediction blocks may be classified in different manners, for example, may be classified as shown in FIG. 1 in which left spatially adjacent prediction blocks include a lower left block $A_0$ and a directly left block $A_1$ that are of the current block, upper spatially adjacent prediction blocks include an upper right block $B_0$, a directly upper block $B_1$, and an upper left block $B_2$ that are of the current block, and co-located blocks include a lower right block $C_0$ and a central block $C_1$. When the MVP of the current block is obtained based on a reconstructed pixel in an adjacent area of the current block, the reconstructed pixel is selected in a part of the adjacent area of the current block. Co-located blocks may be classified as shown in FIG. 2, and the reconstructed pixel is selected in an L-shaped area around the current block. In the embodiments of this application, whether a motion vector type of a first motion vector of an adjacent block of the current block is the same as a motion vector type of a motion vector of the current block needs to be determined, and a motion vector of the adjacent block or a scaling value of the motion vector is determined as a MVP of the current block based on an actual situation, to improve motion vector prediction efficiency.

Figure 3:
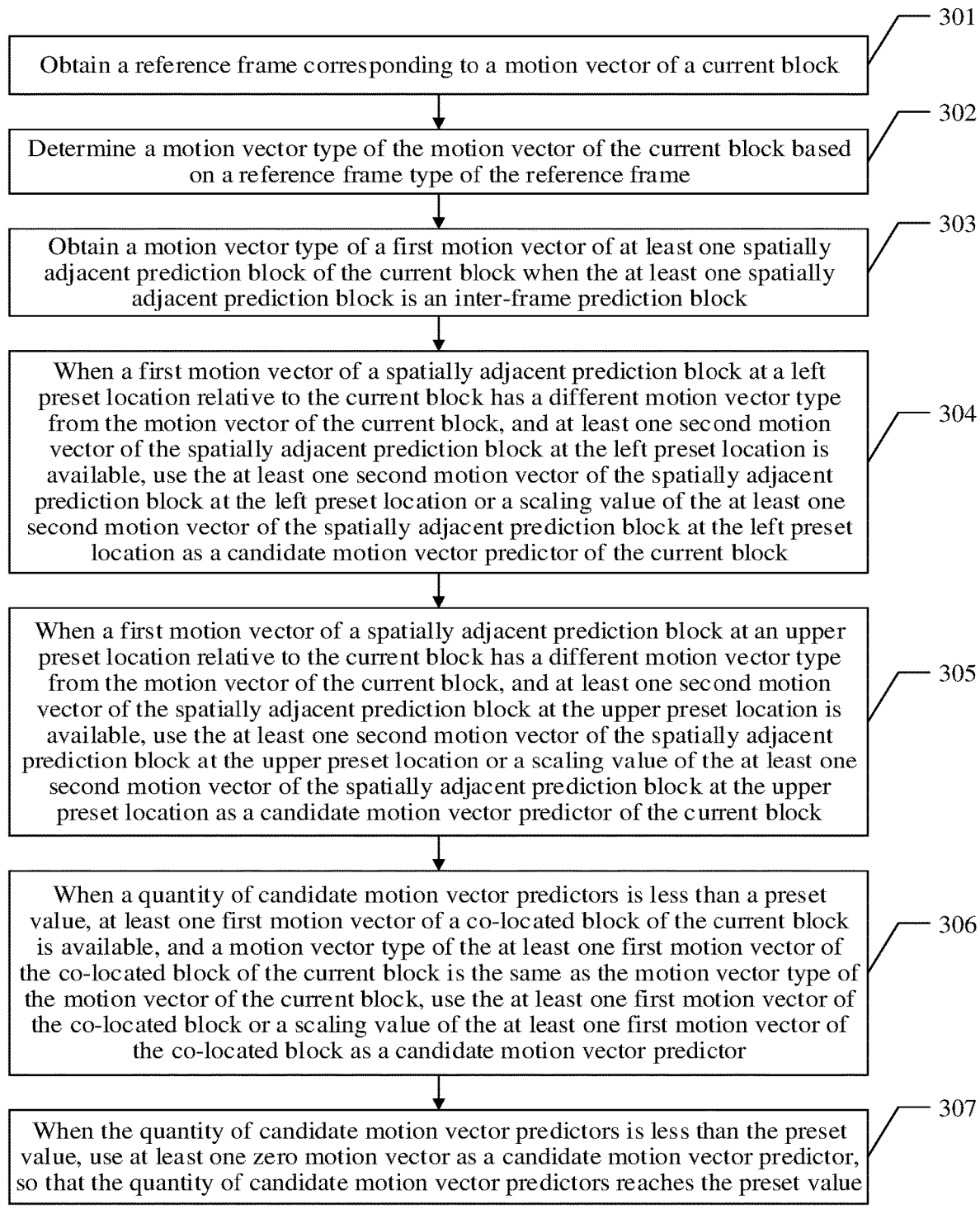
FIG. 3 is a schematic diagram of an embodiment of a motion vector prediction method according to an embodiment of this application.

For ease of understanding, the following describes a specific procedure in the embodiments of this application. Referring to FIG. 3, when a spatially adjacent pixel block of the current block includes at least one spatially adjacent prediction block of the current block, an embodiment of a motion vector prediction method according to an embodiment of this application includes the following steps.

301. Obtain a reference frame corresponding to a motion vector of the current block.

A device obtains the reference frame corresponding to the motion vector of the current block. The device segments a picture into a plurality of picture blocks with a same specification according to the H.265 video coding standard. The device first selects, as the current block, a picture block being coded/decoded, then obtains a reference frame index corresponding to the motion vector of the selected current block, and subsequently determines, based on index information, the reference frame corresponding to the motion vector of the current block.

It should be noted that, when a picture block is predicted, a picture in which the current block is located is referred to as a current frame, and a frame that has been coded/decoded before the current frame is coded/decoded is referred to as a reconstructed frame. The current frame may be a unidirectional predictive frame or a bidirectional predictive frame. If the current frame is the unidirectional predictive frame, the current frame has one reference frame list L0. If the current frame is the bidirectional predictive frame, the current frame has two reference frame lists. The two lists are respectively referred to as L0 and L1. Each list includes at least one reconstructed frame, referred to as a reference frame of the current frame. The reference frame provides a reference pixel for inter-frame prediction in the current frame. The device determines, based on the reference frame index, the reference frame to which the motion vector of the current block points.

It may be understood that inter-frame prediction may be performed on a current block in an inter mode through forward prediction, backward prediction, or bidirectional prediction. When the forward prediction is performed, the current block has one forward reference frame list (L0) and one forward motion vector (L0_MV). When the backward prediction is performed, the current block has one backward reference frame list (L1) and one backward MV (L1_MV). When the bidirectional prediction is performed, the current block has two reference frame lists L0 and L1, and also has one L0_MV and one L1_MV. In other words, any block in the inter mode has one or two MVs. A MVP list may be constructed for each MV in the block. The reference frame index is identified in a bitstream. For example, syntactic elements ref_idx_10 and ref_idx_11 in HEVC respectively indicate reference frame indexes in the reference frame lists L0 and L1. In this embodiment of this application, each current block may be processed to determine an MVP. Each current block may have one or two MVP lists. This is not limited herein.

302. Determine a motion vector type of the motion vector of the current block based on a reference frame type of the reference frame.

After obtaining the reference frame, the device obtains related information from the reference frame, and determines the reference frame type of the reference frame. The reference frame type of the reference frame includes a long-term reference frame or a short-term reference frame. Then, the device determines the motion vector type of the motion vector of the current block based on the reference frame type of the reference frame and a correspondence. When the reference frame is the long-term reference frame, a motion vector that is of the current block and that corresponds to the long-term reference frame is a LMV. When the reference frame is the short-term reference frame, a motion vector that is of the current block and that corresponds to the short-term reference frame is a SMV.

303. Obtain a motion vector type of a first motion vector of at least one spatially adjacent prediction block of the current block when the at least one spatially adjacent prediction block is an inter-frame prediction block.

After determining the reference frame type of the reference frame and the motion vector type of the motion vector of the current block, when the at least one spatially adjacent prediction block of the current block is the inter-frame prediction block, the device accesses the at least one spatially adjacent prediction block of the current block in a preset order. The device obtains the first motion vector from the at least one spatially adjacent prediction block of the current block, and determines the motion vector type of the first motion vector of the spatially adjacent prediction block of the current block, that is, determines that the first motion vector is a LMV or a SMV.

It should be noted that the first motion vector is a motion vector used when motion compensation is performed on a spatially adjacent prediction block for which inter-frame predictive coding is used. In other words, the first motion vector is used to perform inter-frame prediction on the spatially adjacent prediction block. For example, the first motion vector may be an L0_MV and/or an L1_MV.

It may be understood that after determining the reference frame type of the reference frame and the motion vector type of the motion vector of the current block, when all spatially adjacent prediction blocks of the current block are intra-frame prediction blocks, the device first determines, in a virtual reference frame of at least one of the spatially adjacent prediction blocks, a virtual reference block having a slightest pixel difference from the spatially adjacent prediction block, and then uses a motion vector between the virtual reference block and the spatially adjacent prediction block as a MVP of the current block. A reference frame type of the virtual reference frame is the same as the reference frame type of the reference frame corresponding to the motion vector of the current block.

304. When a first motion vector of a spatially adjacent prediction block at a left preset location relative to the current block has a different motion vector type from the motion vector of the current block, and at least one second motion vector of the spatially adjacent prediction block at the left preset location is available, use the at least one second motion vector of the spatially adjacent prediction block at the left preset location or a scaling value of the at least one second motion vector of the spatially adjacent prediction block at the left preset location as a candidate MVP of the current block.

In a feasible implementation, the spatially adjacent prediction block at the left preset location may be all left spatially adjacent prediction blocks.

The device determines whether at least one of first motion vectors of the left spatially adjacent prediction blocks of the current block that has a same motion vector type as the motion vector of the current block exists. If the at least one of the first motion vectors exists, the device selects, from the left spatially adjacent prediction blocks, at least one first motion vector or a scaling value of the first motion vector as a candidate MVP, and adds the candidate MVP to an MVP list. If the at least one of the first motion vectors does not exist, in other words, when the first motion vectors of all the left spatially adjacent prediction blocks of the current block have different motion vector types from the motion vector of the current block, the device determines whether second motion vectors of the left spatially adjacent prediction blocks are available, and when at least one second motion vector of the left spatially adjacent prediction blocks is available, uses the at least one second motion vector of the left spatially adjacent prediction blocks or a scaling value of the at least one second motion vector of the left spatially adjacent prediction blocks as a candidate MVP of the current block.

It should be noted that there may be two types in which the first motion vectors of all the left spatially adjacent prediction blocks of the current block have different motion vector types from the motion vector of the current block. In a type 1, the first motion vectors of all the left spatially adjacent prediction blocks of the current block are LMV s, and the motion vector type of the motion vector of the current block is a SMV. In a type 2, the first motion vectors of all the left spatially adjacent prediction blocks of the current block are SMVs, and the motion vector type of the motion vector of the current block is a LMV.

It may be understood that if a motion vector of a block is available, at least two conditions need to be met. A first condition is as follows. This block is in the picture, and this block and the current block belong to a same slice or a same slice segment. A second condition is as follows. Inter-frame predictive coding is used for this block. There may further be other constraints. For example, this block and the current block belong to a same tile or the like. These constraints are different in different standards. This is not specifically limited herein.

For example, a process in which the device determines whether the at least one of the first motion vectors of the left spatially adjacent prediction blocks of the current block that has the same motion vector type as the motion vector of the current block exists includes three rounds of screening. A first round of screening is as follows. The device successively accesses the first motion vectors of the left spatially adjacent prediction blocks in a preset order 1, determines whether the first motion vectors meet a condition 1 "the first motion vector is available and a reference frame of the first motion vector has a same picture order count (POC) as the reference frame of the motion vector of the current block", and first uses, as a candidate MVP, a first motion vector meeting the condition 1. A second round of screening is as follows: The device successively accesses the first motion vectors of the left spatially adjacent prediction blocks in the preset order 1, and determines whether the first motion vectors meet a condition 2 "the first motion vector is available and a reference frame of the first motion vector has a same type as the reference frame of the motion vector of the current block". For a first motion vector meeting the condition 2, the first motion vector or a scaling value of the first motion vector is used as a candidate MVP. When types of the two reference frames are short-term reference frames and are not a same frame, the first motion vector of the spatially adjacent prediction block needs to be scaled before being used as the candidate MVP. A scaling value of the motion vector is obtained based on a ratio between differences of two groups of POCs. For example, motion vector scaling processing in HEVC is performed. If none of the first motion vectors meets the condition 2, a third round of screening is performed. The third round of screening is as follows. The device successively accesses second motion vectors of the left spatially adjacent prediction blocks in a preset order 2, and determines whether the second motion vectors of the left spatially adjacent prediction blocks are available. The access order 2 may be the same as or different from the access order 1. For example, the access order 2 may be an order from a lower left block $A_0$ to a directly left block $A_1$.

305. When a first motion vector of a spatially adjacent prediction block at an upper preset location relative to the current block has a different motion vector type from the motion vector of the current block, and at least one second motion vector of the spatially adjacent prediction block at the upper preset location is available, use the at least one second motion vector of the spatially adjacent prediction block at the upper preset location or a scaling value of the at least one second motion vector of the spatially adjacent prediction block at the upper preset location as a candidate MVP of the current block.

In a feasible implementation, the spatially adjacent prediction block at the upper preset location may be all upper spatially adjacent prediction blocks.

The device determines whether at least one of first motion vectors of the upper spatially adjacent prediction blocks of the current block that has a same motion vector type as the motion vector of the current block exists. If the at least one of the first motion vectors exists, the device selects, from the upper spatially adjacent prediction blocks, at least one first motion vector or a scaling value of the first motion vector as a candidate MVP, and adds the candidate MVP to an MVP list. If the at least one of the first motion vectors does not exist, in other words, when the first motion vectors of all the upper spatially adjacent prediction blocks of the current block have different motion vector types from the motion vector of the current block, the device determines whether second motion vectors of the upper spatially adjacent prediction blocks are available, and when at least one second motion vector of the upper spatially adjacent prediction blocks is available, uses the at least one second motion vector of the upper spatially adjacent prediction blocks or a scaling value of the at least one second motion vector of the upper spatially adjacent prediction blocks as a candidate MVP of the current block.

For example, a process in which the device determines whether the at least one of the first motion vectors of the upper spatially adjacent prediction blocks of the current block that has the same motion vector type as the motion vector of the current block exists includes three rounds of screening. A first round of screening is as follows. The device successively accesses the first motion vectors of the upper spatially adjacent prediction blocks in a preset order 3, and determines whether the first motion vectors meet the condition 1 "the first motion vector is available and a reference frame of the first motion vector has a same POC as the reference frame of the motion vector of the current block". The device first determines, as a candidate MVP, a first motion vector meeting the condition 1, and then determines whether the upper spatially adjacent prediction blocks meet a condition 3 "MVs of both a directly left block and a lower left block in left spatially adjacent prediction blocks are unavailable". If the condition 3 is met, a second round of screening is performed. A second round of screening is as follows. The device successively accesses the first motion vectors of the upper spatially adjacent prediction blocks in the preset order 3, and determines whether the first motion vectors meet the condition 2 "the first motion vector is available and a reference frame of the first motion vector has a same type as the reference frame of the motion vector of the current block". For a first motion vector meeting the condition 2, the first motion vector or a scaling value of the first motion vector is used as a candidate MVP. When types of the two reference frames are short-term reference frames and are not a same frame, the first motion vector of the spatially adjacent prediction block needs to be scaled before being used as the candidate MVP. A scaling value of the motion vector is obtained based on a ratio between differences of two groups of POCs. For example, motion vector scaling processing in HEVC is performed. If none of the first motion vectors meets the condition 2, a third round of screening is performed. The third round of screening is as follows. The device successively accesses second motion vectors of the upper spatially adjacent prediction blocks in a preset order 4, and determines whether the second motion vectors of the upper spatially adjacent prediction blocks are available. The access order 4 may be the same as or different from the access order 3. For example, the access order 4 may be an order from an upper right block $B_0$ to a directly upper block $B_1$ to an upper left block $B_2$.

It should be noted that, when a selected second motion vector is a SMV, and a POC difference corresponding to the second motion vector is different from a POC difference corresponding to the motion vector of the current block, the second motion vector is used as a candidate MVP after being scaled. When a selected second motion vector is a LMV, or a POC difference corresponding to the second motion vector is the same as a POC difference corresponding to the motion vector of the current block, the second motion vector does not need to be scaled, is directly used as a candidate MVP, and is added to an MVP list.

It may be understood that, in this case, if the MVP list includes a same candidate MVP, the repeated candidate MVP is removed from the MVP list, and a candidate MVP quantity is updated.

306. When a quantity of candidate MVPs is less than a preset value, at least one first motion vector of a co-located block of the current block is available, and a motion vector type of the at least one first motion vector of the co-located block of the current block is the same as the motion vector type of the motion vector of the current block, use the at least one first motion vector of the co-located block or a scaling value of the at least one first motion vector of the co-located block as a candidate MVP.

Optionally, when the quantity of candidate MVPs is less than the preset value, and the device determines that the first motion vector of the co-located block of the current block is available, and the motion vector type of the first motion vector of the co-located block of the current block is the same as the motion vector type of the motion vector of the current block, the device uses the at least one first motion vector of the co-located block or the scaling value of the at least one first motion vector of the co-located block as the candidate MVP.

It should be noted that, when the quantity of candidate MVPs selected from spatially adjacent prediction blocks is less than N (in other words, the MVP list is not fully filled, and a length of the MVP list is N), an MVP is selected from the first motion vector of the co-located block, and is added to the MVP list. For example, a value of N may be that N=2 or N=3.

For example, the device successively accesses first motion vectors of a lower right block $C_0$ and a central block $C_1$ in co-located blocks, and determines whether the first motion vectors obtained from the co-located blocks meet the condition 2 "the first motion vector is available and a reference frame of the first motion vector has a same type as the reference frame of the motion vector of the current block". For a first motion vector meeting the condition 2, the first motion vector or a scaling value of the first motion vector is used as a candidate MVP.

307. When the quantity of candidate MVPs is less than the preset value, use at least one zero motion vector as a candidate MVP such that the quantity of candidate MVPs reaches the preset value.

If the quantity of candidate MVPs is still less than the preset value, the device uses the at least one zero motion vector as the MVP such that the quantity of candidate MVPs of the current block reaches the preset value.

In this embodiment of this application, when the motion vector type of the motion vector of the current block is different from a motion vector type of a first motion vector of an adjacent block, the candidate MVP of the current block is determined, that is, the MVP list of the current block is supplemented with the second motion vector having a same motion vector type as the motion vector of the current block, to enrich the MVP list and improve motion vector prediction efficiency.

Optionally, a method for deriving a second motion vector (and a first motion vector) for the foregoing spatially adjacent pixel blocks is provided. After the spatially adjacent pixel block (which is briefly referred to as an adjacent block) is reconstructed and a reconstructed pixel is obtained, a motion search is performed in a reference frame using the reconstructed pixel of the adjacent block based on a predictive coding mode of the adjacent block and a type of an MV used when motion compensation is performed on the adjacent block, to obtain the second motion vector (and obtain the first motion vector if the adjacent block is an intra-frame prediction block). There may be the following four types of adjacent blocks, and processing manners of all the types of adjacent blocks are separately provided.

(A) If inter-frame prediction is used for the adjacent block and only a SMV is used for motion compensation (in other words, the first motion vector of the adjacent block includes only the SMV), a motion search is performed in a long-term reference frame to derive a LMV as the second motion vector, and the SMV used for the motion compensation performed on the adjacent block is used as the first motion vector. As an example, the following processing is included. A start point of the motion search is first determined. All LMVs in spatially adjacent prediction blocks (optionally, a co-located block may be further included) of the adjacent block are found (the LMVs are from first motion vectors and second motion vectors of these blocks). In particular, when there is no available LMV, the second motion vector is unavailable. Motion compensation is performed using the reconstructed pixel of the adjacent block as a template and using each LMV as a motion vector, to obtain a difference picture (namely, a first difference picture) between a template area in a current frame and a corresponding template area in a reference frame to which the LMV points. A location to which an LMV corresponding to a first difference picture with lowest energy points is used as a search start point LMV start in a next step of motion search. The energy of the first difference picture may be calculated in any one of the following three manners a sum of squared differences (SSD) of all pixels in the difference picture, a sum of absolute differences (SAD) of all pixels in the difference picture, and a sum of absolute Hadamard transformed differences (SATD) obtained after Hadamard transform is performed on the difference picture. The reconstructed pixel of the adjacent block may be all reconstructed pixels of the adjacent block, may be a reconstructed pixel in an L-shaped area formed by combining lower right rectangular pixels, pixels in a plurality of right columns, and pixels in a plurality of lower rows, or the like. This is not specifically limited herein.

Then, a motion search is performed based on the start point, and the derived LMV is determined. An optimal MV is searched, using the reconstructed pixel of the adjacent block as a template and using LMV start as the start point, in a search window with a search range $[-X_1, X_1]$ in a long-term reference frame corresponding to LMV start. This optimal MV brings lowest energy of a difference picture (namely, a second difference picture) between the template area in the current frame and a template area corresponding to a search location to which the MV points. This optimal MV is determined as the derived LMV. Search precision may be ¼ pixel precision or ½ pixel precision, and a search method may be a full search, a diamond quick search (diamond search), or a hexagon quick search (hexagon search). $X_1$ is a positive integer greater than or equal to 1. For example, $X_1$ is equal to 1, 2, 3, or 4. The energy of the second difference picture may be calculated in one of the following three manners an SAD, an SSD, and an SATD. A method for calculating the energy of the second difference picture may be the same as or different from that for calculating the energy of the first difference picture. As an example, the SAD is used for both the energy of the first difference picture and the energy of the second difference picture. Alternatively, the SAD is used for the energy of the first difference picture, and the SATD is used for the energy of the second difference picture.

(B) If inter-frame prediction is used for the adjacent block and only an LMV is used for motion compensation (in other words, the first motion vector of the adjacent block includes only the LMV), a motion search is performed in a short-term reference frame to derive an SMV as the second motion vector, and the LMV of the adjacent block is used as the first motion vector. Either of the following two methods may be used for implementation. A method 1 is as follows. A start point of the motion search in each short-term reference frame is first determined. For each reference frame Fs in M short-frame reference frames in a reference frame list, all SMVs in spatially adjacent prediction blocks (optionally, a co-located block may be further included) of the adjacent block are scaled into SMVs pointing to the reference frame Fs (the SMVs are from first motion vectors and second motion vectors of these blocks). In particular, when there is no available SMV, the second motion vector is unavailable.

Motion compensation is performed in the reference frame Fs using the reconstructed pixel of the adjacent block as a template and using each SMV as a motion vector, and an SMV corresponding to a first difference picture with lowest energy is used as a start point SMV_start of the motion search in the short-term reference frame Fs. The foregoing process is performed in all short-term reference frames, to determine the start point of the motion search in each short-term reference frame. For each reference frame in the M short-term reference frames, an optimal MV in the short-term reference frame is determined. For each reference frame Fs in the M reference frames, an optimal MV is searched in a search window with a search range $[-X_2, X_2]$ using the reconstructed pixel of the adjacent block as a template and using SMV_start corresponding to the reference frame Fs as the start point of the motion search. This optimal MV brings lowest energy of a second difference picture between a template area in a current frame and a template area corresponding to a search location to which the MV points. $X_2$ is a positive integer greater than or equal to 1. For example, $X_2$ is equal to 1, 2, 3, or 4, or may be another value. This is not specifically limited herein. The foregoing process is performed in all short-term reference frames, to determine an optimal MV in each short-term reference frame. Finally, the derived SMV is determined. Second difference energy corresponding to optimal MVs in the M short-term reference frames is compared, and an optimal MV corresponding to lowest second difference energy is determined as the finally derived SMV. A method 2 is as follows. A start point of the motion search is first determined. All SMVs in spatially adjacent prediction blocks of the adjacent block are found, motion compensation is performed, using the reconstructed pixel of the adjacent block as a template and using each SMV as a motion vector, in a reference frame corresponding to each SMV, and an SMV corresponding to a first difference picture with lowest energy is used as a start point SMV_start of the motion search. Then, the derived SMV is determined. An optimal MV is searched, using the reconstructed pixel of the adjacent block as a template and using SMV_start as the start point of the motion search, in a search window with a search range $[-X_2, X_2]$ in a short-term reference frame corresponding to SMV_start. This optimal MV brings lowest energy of a second difference picture between a template area in a current frame and a template area corresponding to a search location to which the MV points.

(C) If inter-frame prediction is used for the adjacent block and an SMV and an LMV are used for motion compensation (in other words, the first motion vector of the adjacent block includes the SMV and the LMV), the second motion vector does not need to be derived for the adjacent block, and the second motion vector of the adjacent block is unavailable.

(D) If intra-frame prediction is used for the adjacent block, an LMV is derived according to the method shown in (A), and an SMV is derived according to the method shown in (B). Energy of second difference pictures corresponding to the SMV and the LMV is compared, an MV corresponding to a second difference picture with lower energy is used as the first motion vector, and an MV corresponding to a second difference picture with higher energy is used as the second motion vector. Optionally, alternatively, the SMV is always used as the first motion vector, and the LMV is always used as the second motion vector.

Optionally, in an implementation, when a frame is coded/decoded, first motion vectors of all blocks in the frame are stored in a motion vector field in a form of 4×4 blocks. This is similar to a motion vector storage manner in HEVC.

Second motion vectors are stored in another motion vector field in a form of 4×4 blocks. Therefore, two types of MVs of spatially adjacent prediction blocks may be obtained in corresponding motion vector fields. After coding/decoding of the frame is completed, only the first motion vector field needs to be reserved in a memory, and the second motion vector field may not be reserved and stored.

Optionally, to reduce calculation complexity, when an inter-frame coding mode is used for a reconstructed block and a first motion vector of the reconstructed block includes only one type of MV, for the reconstructed block, if all first motion vectors of spatially adjacent prediction blocks of the reconstructed block have a same type as the first motion vector of the reconstructed block, the foregoing processing of performing a motion search on the reconstructed block to derive a second motion vector of the reconstructed block is not performed, and the second motion vector of the block is unavailable.

Optionally, to reduce calculation complexity, a coding tree unit (CTU) index Start_CTU_index may be added to a slice header, and the foregoing processing of performing a motion search on the reconstructed block to derive a second motion vector of the reconstructed block (and derive a first motion vector if the reconstructed block is an intra-frame code block) is not performed on blocks in a CTU whose CTU number is less than Start_CTU_index in a picture. Second motion vectors of these blocks are unavailable, and a first motion vector of an intra-frame code block in these blocks is also unavailable.

Figure 4:
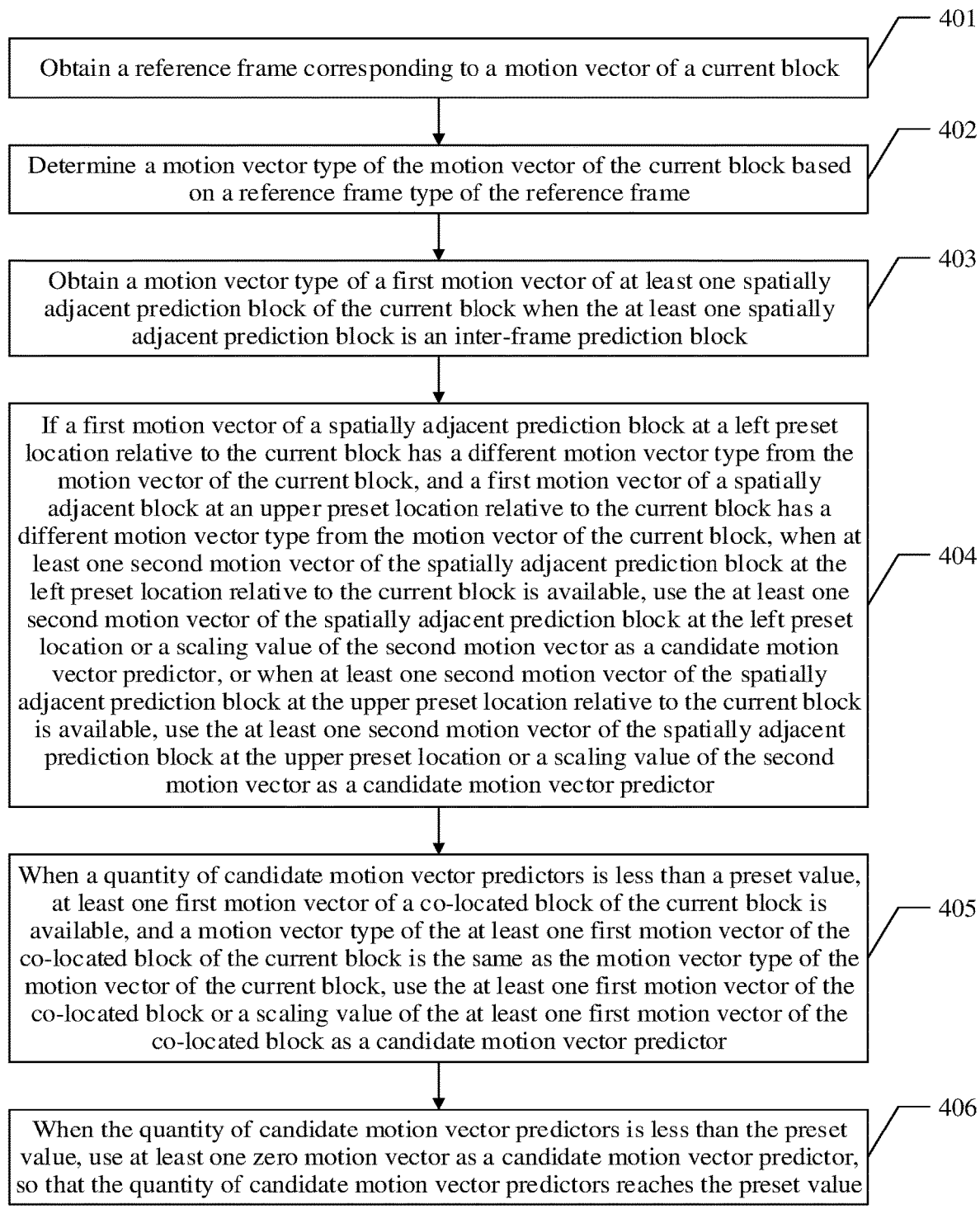
FIG. 4 is a schematic diagram of another embodiment of a motion vector prediction method according to an embodiment of this application.

Referring to FIG. 4, when a spatially adjacent pixel block of the current block includes at least one spatially adjacent prediction block of the current block, another embodiment of a motion vector prediction method according to an embodiment of this application includes the following steps.

401. Obtain a reference frame corresponding to a motion vector of the current block.

402. Determine a motion vector type of the motion vector of the current block based on a reference frame type of the reference frame.

403. Obtain a motion vector type of a first motion vector of at least one spatially adjacent prediction block of the current block when the at least one spatially adjacent prediction block is an inter-frame prediction block.

Step 401 to step 403 in this embodiment are similar to step 301 to step 303 in the embodiment shown in FIG. 3. Details are not described herein again.

404. If a first motion vector of a spatially adjacent prediction block at a left preset location relative to the current block has a different motion vector type from the motion vector of the current block, and a first motion vector of a spatially adjacent prediction block at an upper preset location relative to the current block has a different motion vector type from the motion vector of the current block, when at least one second motion vector of the spatially adjacent prediction block at the left preset location relative to the current block is available, use the at least one second motion vector of the spatially adjacent prediction block at the left preset location or a scaling value of the second motion vector as a candidate MVP, or when at least one second motion vector of the spatially adjacent prediction block at the upper preset location relative to the current block is available, use the at least one second motion vector of the spatially adjacent prediction block at the upper preset location or a scaling value of the second motion vector as a candidate MVP.

A device determines whether at least one of first motion vectors of left spatially adjacent prediction blocks of the current block that has a same motion vector type as the motion vector of the current block exists. If the at least one of the first motion vectors exists, the device selects, from the left spatially adjacent prediction blocks, at least one first motion vector or a scaling value of the first motion vector as a candidate MVP, and adds the candidate MVP to an MVP list. If the at least one of the first motion vectors does not exist, in other words, when the first motion vectors of all the left spatially adjacent prediction blocks of the current block have different motion vector types from the motion vector of the current block, the device determines whether first motion vectors of all upper spatially adjacent prediction blocks of the current block have a same motion vector type as the motion vector of the current block. If the first motion vectors of all the upper spatially adjacent prediction blocks of the current block have a same motion vector type as the motion vector of the current block, the device determines whether second motion vectors in the left spatially adjacent prediction blocks and the upper spatially adjacent prediction blocks of the current block are available, and when at least one of the second motion vectors in the left spatially adjacent prediction blocks and the upper spatially adjacent prediction blocks of the current block is available, uses the at least one of the second motion vectors in the left spatially adjacent prediction blocks and the upper spatially adjacent prediction blocks or a scaling value of the at least one of the second motion vectors in the left spatially adjacent prediction blocks and the upper spatially adjacent prediction blocks as a candidate MVP.

For example, a process in which the device determines whether the at least one of the first motion vectors of the left spatially adjacent prediction blocks of the current block that has the same motion vector type as the motion vector of the current block exists includes two rounds of screening. A first round of screening is as follows. The device successively accesses the first motion vectors of the left spatially adjacent prediction blocks in a preset order 1, determines whether the first motion vectors meet a condition 1 "the first motion vector is available and a reference frame of the first motion vector has a same POC as the reference frame of the motion vector of the current block", and first determines, as a candidate MVP, a first motion vector meeting the condition 1. A second round of screening is as follows: The device successively accesses the first motion vectors of the left spatially adjacent prediction blocks in the preset order 1, and determines whether the first motion vectors meet a condition 2 "the first motion vector is available and a reference frame of the first motion vector has a same type as the reference frame of the motion vector of the current block". For a first motion vector meeting the condition 2, the first motion vector or a scaling value of the first motion vector is used as a candidate MVP. When types of the two reference frames are short-term reference frames and are not a same frame, the first motion vector of the spatially adjacent prediction block needs to be scaled before being used as the candidate MVP. A scaling value of the motion vector is obtained based on a ratio between differences of two groups of POCs. For example, motion vector scaling processing in HEVC is performed.

A process in which the device determines whether the at least one of the first motion vectors of the upper spatially adjacent prediction blocks of the current block that has the same motion vector type as the motion vector of the current block exists includes two rounds of screening. A first round of screening is as follows. The device successively accesses the first motion vectors of the upper spatially adjacent prediction blocks in a preset order 3, determines whether the first motion vectors meet the condition 1 "the first motion vector is available and a reference frame of the first motion vector has a same POC as the reference frame of the motion vector of the current block", and first determines, as a candidate MVP, a first motion vector meeting the condition 1. A second round of screening is as follows. The device successively accesses the first motion vectors of the upper spatially adjacent prediction blocks in the preset order 3, and determines whether the first motion vectors meet the condition 2 "the first motion vector is available and a reference frame of the first motion vector has a same type as the reference frame of the motion vector of the current block". For a first motion vector meeting the condition 2, the first motion vector or a scaling value of the first motion vector is used as a candidate MVP. When types of the two reference frames are short-term reference frames and are not a same frame, the first motion vector of the adjacent block needs to be scaled before being used as the candidate MVP. A scaling value of the motion vector is obtained based on a ratio between differences of two groups of POCs. For example, motion vector scaling processing in HEVC is performed.

The device determines whether the second motion vectors in the left spatially adjacent prediction blocks and the upper spatially adjacent prediction blocks of the current block are available, and if the second motion vectors in the left spatially adjacent prediction blocks and the upper spatially adjacent prediction blocks of the current block are available, uses at least one of the second motion vectors in the left spatially adjacent prediction blocks and the upper spatially adjacent prediction blocks or a scaling value of the at least one of the second motion vectors in the left spatially adjacent prediction blocks and the upper spatially adjacent prediction blocks as a candidate MVP.

It should be noted that, before determining whether the second motion vectors in the left spatially adjacent prediction blocks and the upper spatially adjacent prediction blocks of the current block are available, the device further needs to determine whether an MVP list is null (in other words, no first motion vector of a spatially adjacent prediction block of the current block has a same motion vector type as the motion vector of the current block). When the MVP list is not null, there is at least one candidate in the MVP list. When the MVP list is null, the device successively accesses the second motion vectors in the left spatially adjacent prediction blocks and the upper spatially adjacent prediction blocks in a preset order 5, and uses K available second motion vectors in the left spatially adjacent prediction blocks and the upper spatially adjacent prediction blocks or scaling values of the K second motion vectors as MVPs. K is a positive integer less than or equal to a length N (namely, a preset value) of the MVP list. For example, K=1 or K=2.

It may be understood that the left spatially adjacent prediction blocks and the upper spatially adjacent prediction blocks include blocks located on a left side and an upper side of the current block. Preferably, the left spatially adjacent prediction blocks and the upper spatially adjacent prediction blocks include a directly left block $A_1$, a directly upper block $B_1$, a lower left block $A_0$, an upper right block $B_0$, and an upper left block $B_2$, and the access order 5 may be an order from the directly left block $A_1$ to the directly upper block $B_1$ to the lower left block $A_0$ to the upper right block $B_0$ to the upper left block $B_2$ or an order from the lower left block $A_0$ to the directly left block $A_1$ to the upper right block $B_0$ to the directly upper block $B_1$ to the upper left block $B_2$. Alternatively, preferably, the left spatially adjacent prediction blocks and the upper spatially adjacent prediction blocks include a directly left block $A_1$, a directly upper block $B_1$, and an upper left block $B_2$, and the access order 5 may be an order from the directly left block $A_1$ to the directly upper block $B_1$ to the upper left block $B_2$. Optionally, if the MVP list includes a same candidate MVP, the repeated candidate MVP is removed from the MVP list, and a candidate MVP quantity is updated.

405. When a quantity of candidate MVPs is less than a preset value, at least one first motion vector of a co-located block of the current block is available, and a motion vector type of the at least one first motion vector of the co-located block of the current block is the same as the motion vector type of the motion vector of the current block, use the at least one first motion vector of the co-located block or a scaling value of the at least one first motion vector of the co-located block as a candidate MVP.

Optionally, when the quantity of candidate MVPs is less than the preset value, and the device determines that the first motion vector of the co-located block of the current block is available, and the motion vector type of the first motion vector of the co-located block of the current block is the same as the motion vector type of the motion vector of the current block, the device uses the at least one first motion vector of the co-located block or the scaling value of the at least one first motion vector of the co-located block as the candidate MVP.

It should be noted that, when the quantity of candidate MVPs selected from spatially adjacent prediction blocks is less than N (in other words, the MVP list is not fully filled, and a length of the MVP list is N), an MVP is selected from the first motion vector of the co-located block, and is added to the MVP list. For example, a value of N may be that N=2 or N=3.

For example, the device successively accesses first motion vectors of a lower right block $C_0$ and a central block $C_1$ in co-located blocks, and determines whether the first motion vectors obtained from the co-located blocks meet the condition 2 "the first motion vector is available and a reference frame of the first motion vector has a same type as the reference frame of the motion vector of the current block". For a first motion vector meeting the condition 2, the first motion vector or a scaling value of the first motion vector is used as a candidate MVP.

406. When the quantity of candidate MVPs is less than the preset value, use at least one zero motion vector as a candidate MVP such that the quantity of candidate MVPs reaches the preset value.

If the quantity of candidate MVPs is still less than the preset value, the device uses the at least one zero motion vector as the MVP such that the quantity of candidate MVPs of the current block reaches the preset value.

In this embodiment of this application, when the motion vector type of the motion vector of the current block is different from a motion vector type of a first motion vector of an adjacent block, the candidate MVP of the current block is determined, that is, the MVP list of the current block is supplemented with the second motion vector having a same motion vector type as the motion vector of the current block, to enrich the MVP list and improve motion vector prediction efficiency.

Figure 5:
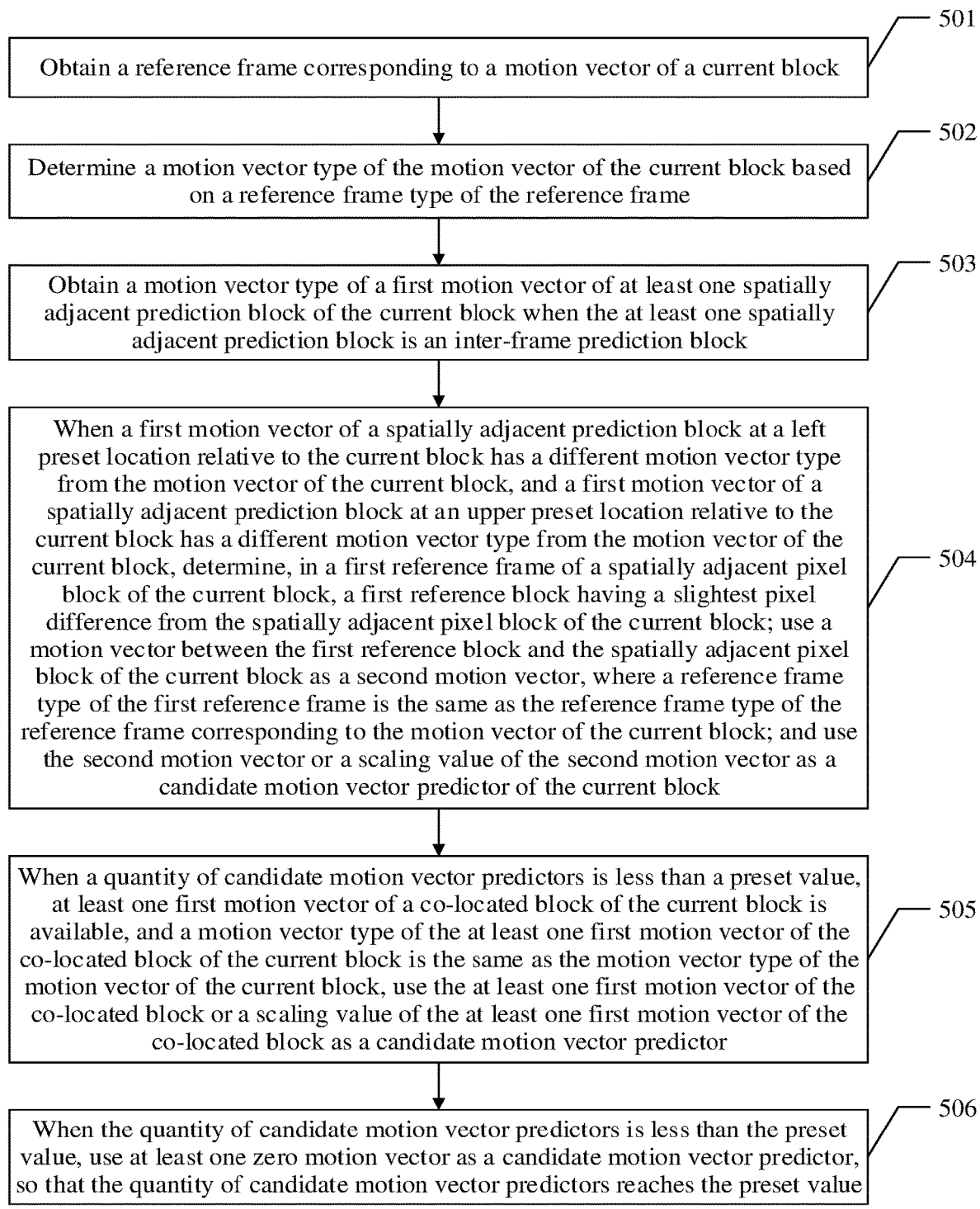
FIG. 5 is a schematic diagram of another embodiment of a motion vector prediction method according to an embodiment of this application.

Referring to FIG. 5, when a spatially adjacent pixel block of the current block includes at least one pixel block that is spatially adjacent to the current block and that is within a preset range, another embodiment of a motion vector prediction method according to an embodiment of this application includes the following steps.

501. Obtain a reference frame corresponding to a motion vector of the current block.

502. Determine a motion vector type of the motion vector of the current block based on a reference frame type of the reference frame.

503. Obtain a motion vector type of a first motion vector of at least one spatially adjacent prediction block of the current block when the at least one spatially adjacent prediction block is an inter-frame prediction block.

Step 501 to step 503 in this embodiment are similar to step 401 to step 403 in the embodiment shown in FIG. 4. Details are not described herein again.

504. When a first motion vector of a spatially adjacent prediction block at a left preset location relative to the current block has a different motion vector type from the motion vector of the current block, and a first motion vector of a spatially adjacent prediction block at an upper preset location relative to the current block has a different motion vector type from the motion vector of the current block, determine, in a first reference frame of the spatially adjacent pixel block of the current block, a first reference block having a slightest pixel difference from the spatially adjacent pixel block of the current block, use a motion vector between the first reference block and the spatially adjacent pixel block of the current block as a second motion vector, where a reference frame type of the first reference frame is the same as the reference frame type of the reference frame corresponding to the motion vector of the current block, and use the second motion vector or a scaling value of the second motion vector as a candidate MVP of the current block.

In a feasible implementation, when first motion vectors of all left spatially adjacent prediction blocks of the current block have different motion vector types from the motion vector of the current block, and first motion vectors of all upper spatially adjacent prediction blocks of the current block have different motion vector types from the motion vector of the current block, determine, in the first reference frame of the pixel block, the first reference block having the slightest pixel difference from the pixel block, use the motion vector between the first reference block and the pixel block as the second motion vector, where the reference frame type of the first reference frame is the same as the reference frame type of the reference frame corresponding to the motion vector of the current block, and use the second motion vector or the scaling value of the second motion vector as the candidate MVP of the current block.

It should be noted that, before generating the second motion vector based on the pixel block spatially adjacent to the current block, whether an MVP list is null (in other words, no first motion vector of a spatially adjacent prediction block of the current block has a same motion vector type as the motion vector of the current block) further needs to be determined. When the MVP list is not null, there is at least one candidate MVP in the MVP list. When the MVP list is null, a device uses the pixel block spatially adjacent to the current block as a template, and finds, in a template matching manner, an optimal matching location in the reference frame to which the motion vector of the current block points. A displacement vector between the optimal matching location and a template area of the current block is used as a second motion vector, and the second motion vector is used as a candidate MVP.

For example, a process of determining the second motion vector may be divided into two steps. Step 1. MVs in a "candidate motion vector set" are compared to determine a start point of a motion search. The candidate motion vector set includes at least one of the following two types of MVs: a zero vector (0, 0) and a global motion vector. Motion compensation is performed in the reference frame of the MV of the current block using the pixel block that is spatially adjacent to the current block and that is within the preset range as a template and using each MV in the candidate motion vector set as a motion vector, to obtain a difference picture (namely, a first difference picture) between a template area in a current frame and a corresponding template area in the reference frame. The device uses a location to which an MV corresponding to a first difference picture with lowest energy points as a search start point MV_start in a next step of motion search. The energy of the first difference picture may be calculated in any one of the following three manners a sum of squared differences of all pixels in the difference picture, a sum of absolute differences of all pixels in the difference picture, and a sum of absolute Hadamard transformed differences obtained after Hadamard transform is performed on the difference picture. An adjacent reconstructed pixel of the current block may be an upper reconstructed pixel of the current block, a left reconstructed pixel of the current block, a pixel in an L-shaped area formed by combining a left reconstructed pixel and an upper reconstructed pixel of the current block, or the like. This is not specifically limited herein.

There may be one or more global motion vectors. The global motion vector is identified in a bitstream (for example, identified in a slice header of the current frame), and indicates an MV pointing from the current frame to a long-term reference frame. Preferably, one long-term reference frame may have at least one global motion vector, and a short-term reference frame has no global motion vector. If the MV of the current block is a short-term MV, the candidate motion vector set includes only a zero vector. If the MV of the current block is a long-term MV, the candidate motion vector set of the current block includes a zero vector, and may further include at least one global motion vector. The global motion vector may be derived by an encoder by analyzing a motion vector that is in each area in the current frame and that is relative to a long-term reference frame. For example, one or two motion vectors with a highest occurrence frequency in motion vectors in all areas are selected as global motion vectors. A decoding device obtains the global motion vector of the long-term reference frame of the current frame by parsing the bitstream (for example, the slice header). Optionally, quantity information of the global motion vector of the long-term reference frame may be transmitted in the bitstream. When the quantity information indicates that a global motion vector quantity is 0, the candidate motion vector set includes no global motion vector, but includes only a zero vector.

Step 2. Perform a motion search based on the start point, to determine the second motion vector. An optimal MV is searched in a search window in the reference frame of the MV of the current block using the pixel block that is spatially adjacent to the current block and that is within the preset range as a template and using MV_start as the start point. This optimal MV brings lowest energy of a difference picture (namely, a second difference picture) between the template area in the current frame and a template area corresponding to a search location to which the MV points. This optimal MV is determined as the second motion vector.

Search precision may be ¼ pixel precision or ½ pixel precision, and a search method may be a full search, a diamond quick search, or a hexagon quick search. A search window size may be fixed to 8×8 or 16×16, or may be adaptively set based on a type of MV_start. For example, when MV_start is (0, 0), the search window size is 16×16. When MV_start is not (0, 0), the search window size is 8×8. The energy of the second difference picture may be calculated in any one of the following three manners a sum of squared differences of all pixels in the difference picture, a sum of absolute differences of all pixels in the difference picture, and a sum of absolute Hadamard transformed differences obtained after Hadamard transform is performed on the difference picture. A method for calculating the energy of the second difference picture is not necessarily the same as that for calculating the energy of the first difference picture. For example, the sum of absolute differences of all pixels in the difference picture is used for both the energy of the first difference picture and the energy of the second difference picture. Alternatively, the sum of absolute differences of all pixels in the difference picture is used for the energy of the first difference picture, and the sum of squared differences of all pixels in the difference picture is used for the energy of the second difference picture. This is not specifically limited herein.

It may be understood that, in this case, if the MVP list includes a same candidate MVP, the repeated candidate MVP is removed from the MVP list, and a candidate MVP quantity is updated.

505. When a quantity of candidate MVPs is less than a preset value, at least one first motion vector of a co-located block of the current block is available, and a motion vector type of the at least one first motion vector of the co-located block of the current block is the same as the motion vector type of the motion vector of the current block, use the at least one first motion vector of the co-located block or a scaling value of the at least one first motion vector of the co-located block as a candidate MVP.

Optionally, when the quantity of candidate MVPs is less than the preset value, and the device determines that the first motion vector of the co-located block of the current block is available, and the motion vector type of the first motion vector of the co-located block of the current block is the same as the motion vector type of the motion vector of the current block, the device uses the at least one first motion vector of the co-located block or the scaling value of the at least one first motion vector of the co-located block as the candidate MVP.

It should be noted that, when the quantity of candidate MVPs selected from spatially adjacent prediction blocks is less than N (in other words, the MVP list is not fully filled, and a length of the MVP list is N), an MVP is selected from the first motion vector of the co-located block, and is added to the MVP list. For example, a value of N may be that N=2 or N=3.

For example, the device successively accesses first motion vectors of a lower right block $C_0$ and a central block $C_1$ in co-located blocks, and determines whether the first motion vectors obtained from the co-located blocks meet a condition 2 "the first motion vector is available and a reference frame of the first motion vector has a same type as the reference frame of the motion vector of the current block". For a first motion vector meeting the condition 2, the first motion vector or a scaling value of the first motion vector is used as a candidate MVP.

506. When the quantity of candidate MVPs is less than the preset value, use at least one zero motion vector as a candidate MVP such that the quantity of candidate MVPs reaches the preset value.

If the quantity of candidate MVPs is still less than the preset value, the device uses the at least one zero motion vector as the MVP such that the quantity of candidate MVPs of the current block reaches the preset value. In this embodiment of this application, when the motion vector type of the motion vector of the current block is different from a motion vector type of a first motion vector of an adjacent block, the second motion vector is derived based on the pixel block that is spatially adjacent to the current block and that is within the preset range, and the second motion vector is determined as the candidate MVP of the current block. The second motion vector has a same type as the motion vector of the current block. Therefore, the MVP list is enriched and motion vector prediction efficiency is improved.

It should be understood that each of the foregoing motion vector prediction methods may be used in a coding method for the current block, or may be used in a decoding method for the current block.

Figure 6:
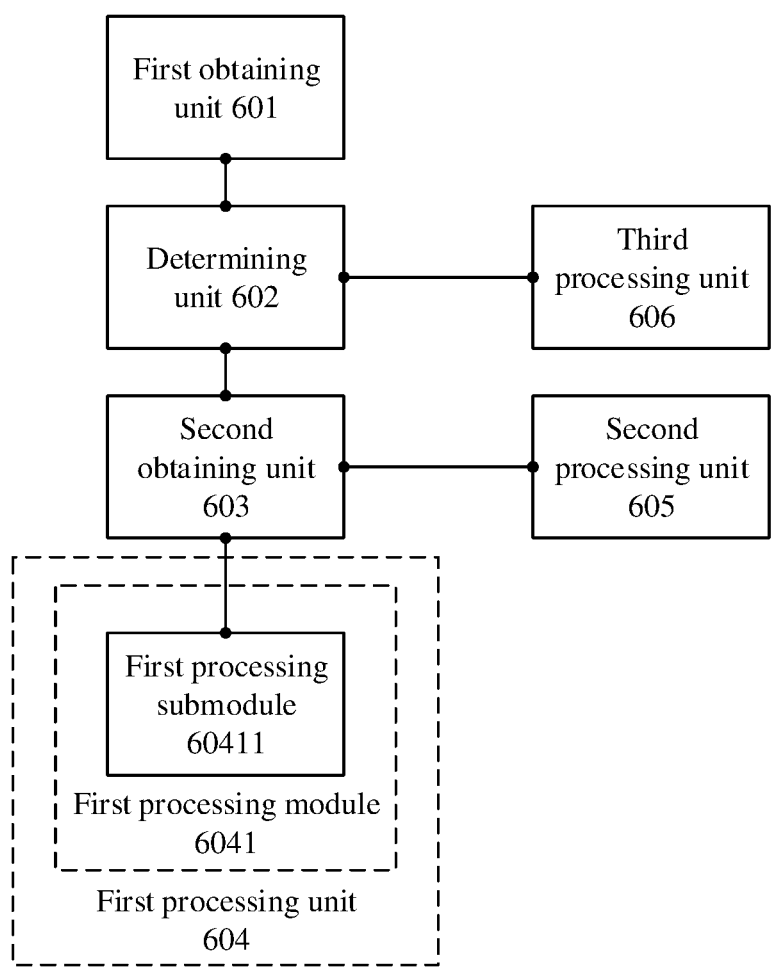
FIG. 6 is a schematic diagram of an embodiment of a motion vector prediction device according to an embodiment of this application.

The foregoing describes the motion vector prediction methods in the embodiments of this application, and the following describes a motion vector prediction device in an embodiment of this application. Referring to FIG. 6, an embodiment of a motion vector prediction device according to an embodiment of this application includes a first obtaining unit 601 configured to obtain a reference frame corresponding to a motion vector of a current block, a determining unit 602 configured to determine a motion vector type of the motion vector of the current block based on a reference frame type of the reference frame, where the motion vector type includes a SMV or a LMV, the SMV is obtained from a short-term reference frame, and the LMV is obtained from a long-term reference frame, a second obtaining unit 603 configured to obtain a motion vector type of a first motion vector of at least one spatially adjacent prediction block of the current block when the at least one spatially adjacent prediction block is an inter-frame prediction block, where the first motion vector is used to perform inter-frame prediction on the spatially adjacent prediction block, and a first processing unit 604 configured to, when the obtained motion vector type of the first motion vector is different from all motion vector types of motion vectors of the current block, determine a second motion vector of a spatially adjacent pixel block of the current block based on decoding information of the spatially adjacent pixel block, and use the second motion vector or a scaling value of the second motion vector as a candidate MVP of the current block.

Optionally, the device may further include a second processing unit 605 configured to use the at least one first motion vector as a candidate MVP of the current block when the obtained motion vector type of the at least one first motion vector is the same as the motion vector type of the motion vector of the current block.

Optionally, the device may further include a third processing unit 606 configured to, when all spatially adjacent prediction blocks of the current block are intra-frame prediction blocks, determine, in a virtual reference frame of at least one of the spatially adjacent prediction blocks, a virtual reference block having a slightest pixel difference from the spatially adjacent prediction block, and use a motion vector between the virtual reference block and the spatially adjacent prediction block as a MVP of the current block, where a reference frame type of the virtual reference frame is the same as the reference frame type of the reference frame corresponding to the motion vector of the current block, and the virtual reference frame is a reconstructed frame.

Optionally, the first processing unit 604 may further include a first processing module 6041 configured to determine, in a first reference frame of the spatially adjacent pixel block, a first reference block having a slightest pixel difference from the spatially adjacent pixel block, use a motion vector between the first reference block and the spatially adjacent pixel block as the second motion vector, where a reference frame type of the first reference frame is the same as the reference frame type of the reference frame corresponding to the motion vector of the current block, and use the second motion vector or the scaling value of the second motion vector as the candidate MVP of the current block.

Optionally, the first processing module 6041 may further include a first processing submodule 60411 configured to, when a first motion vector of a spatially adjacent prediction block at a left preset location relative to the current block has a different motion vector type from the motion vector of the current block, and a first motion vector of a spatially adjacent prediction block at an upper preset location relative to the current block has a different motion vector type from the motion vector of the current block, determine, in the first reference frame of the spatially adjacent pixel block, the first reference block having the slightest pixel difference from the spatially adjacent pixel block, use the motion vector between the first reference block and the spatially adjacent pixel block as the second motion vector, where the reference frame type of the first reference frame is the same as the reference frame type of the reference frame corresponding to the motion vector of the current block, and use the second motion vector or the scaling value of the second motion vector as the candidate MVP of the current block.

In this embodiment of this application, when the motion vector type of the motion vector of the current block is different from a motion vector type of a first motion vector of an adjacent block, the second motion vector having a same motion vector type as the motion vector of the current block is used as the candidate MVP of the current block, to enrich a MVP list and improve motion vector prediction efficiency.

Figure 7:
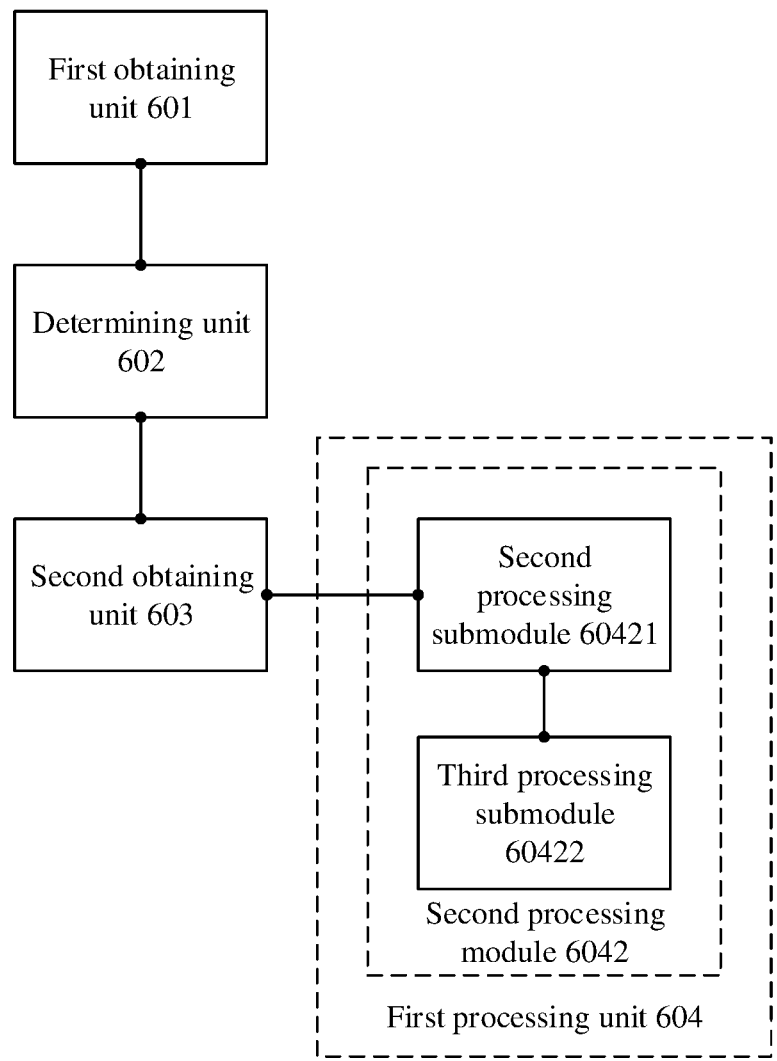
FIG. 7 is a schematic diagram of another embodiment of a motion vector prediction device according to an embodiment of this application.

Referring to FIG. 7, another embodiment of a motion vector prediction device according to an embodiment of this application includes the first obtaining unit 601, the determining unit 602, the second obtaining unit 603, and the first processing unit 604 in the embodiment corresponding to FIG. 6.

Optionally, the first processing unit 604 may further include a second processing module 6042 configured to use a second motion vector of the at least one spatially adjacent prediction block or a scaling value of the second motion vector of the at least one spatially adjacent prediction block as the candidate MVP of the current block.

Optionally, the second processing module 6042 may further include a second processing submodule 60421 configured to, when a first motion vector of a spatially adjacent prediction block at a left preset location relative to the current block has a different motion vector type from the motion vector of the current block, and at least one second motion vector of the spatially adjacent prediction block at the left preset location is available, use the at least one second motion vector of the spatially adjacent prediction block at the left preset location or a scaling value of the at least one second motion vector of the spatially adjacent prediction block at the left preset location as the candidate MVP of the current block, and a third processing submodule 60422 configured to, when a first motion vector of a spatially adjacent prediction block at an upper preset location relative to the current block has a different motion vector type from the motion vector of the current block, and at least one second motion vector of the spatially adjacent prediction block at the upper preset location is available, use the at least one second motion vector of the spatially adjacent prediction block at the upper preset location or a scaling value of the at least one second motion vector of the spatially adjacent prediction block at the upper preset location as the candidate MVP of the current block.

Figure 8:
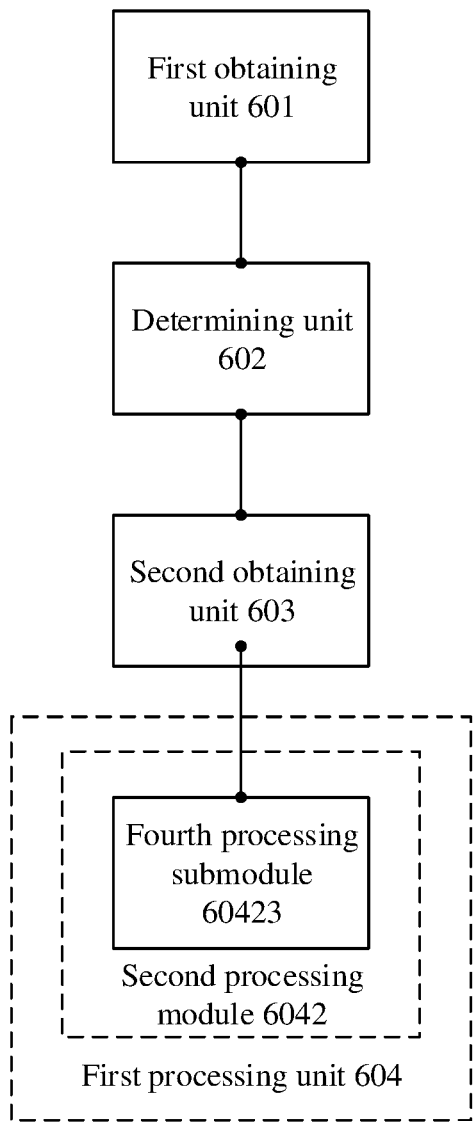
FIG. 8 is a schematic diagram of another embodiment of a motion vector prediction device according to an embodiment of this application.

Referring to FIG. 8, another embodiment of a motion vector prediction device according to an embodiment of this application includes the first obtaining unit 601, the determining unit 602, the second obtaining unit 603, and the first processing unit 604 in the embodiment corresponding to FIG. 6.

Optionally, the first processing unit 604 may further include a second processing module 6042 configured to use a second motion vector of the at least one spatially adjacent prediction block or a scaling value of the second motion vector of the at least one spatially adjacent prediction block as the candidate MVP of the current block.

Optionally, the second processing module 6042 may further include a fourth processing submodule 60423 configured to, if a first motion vector of a spatially adjacent prediction block at a left preset location relative to the current block has a different motion vector type from the motion vector of the current block, and a first motion vector of a spatially adjacent prediction block at an upper preset location relative to the current block has a different motion vector type from the motion vector of the current block, when at least one second motion vector of the spatially adjacent prediction block at the left preset location relative to the current block is available, use the at least one second motion vector of the spatially adjacent prediction block at the left preset location or a scaling value of the second motion vector as the candidate MVP of the current block, or when at least one second motion vector of the spatially adjacent prediction block at the upper preset location relative to the current block is available, use the at least one second motion vector of the spatially adjacent prediction block at the upper preset location or a scaling value of the second motion vector as the candidate MVP of the current block.

It should be understood that the foregoing motion vector prediction device may be used in an encoder for coding the current block, or may be used in a decoder for decoding the current block.

The foregoing separately describes in detail the motion vector prediction devices in the embodiments of this application from a perspective of a modular function entity in FIG. 6 to FIG. 8. The following describes in detail a motion vector prediction device in an embodiment of this application from a perspective of hardware processing.

Figure 9:
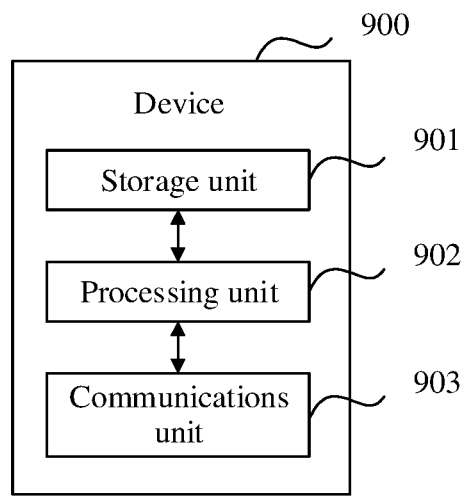
FIG. 9 is a schematic diagram of another embodiment of a motion vector prediction device according to an embodiment of this application.

FIG. 9 is a schematic structural diagram of a motion vector prediction device according to an embodiment of this application. When an integrated unit is used, FIG. 9 shows a schematic diagram of a possible structure of the device in the foregoing embodiments. A device 900 includes a processing unit 902 and a communications unit 903. The processing unit 902 is configured to control and manage an action of the device 900. For example, the processing unit 902 is configured to support the device 900 in performing step 301 to step 307 in FIG. 3, and/or another process in a technology described in this specification. The communications unit 903 is configured to support the device 900 in communicating with another device. The device 900 may further include a storage unit 901 configured to store program code and data of the device.

The processing unit 902 may be a processor or a controller, for example, may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processing unit 902 may implement or execute various example logical blocks, modules, and circuits described with reference to content disclosed in this application. Alternatively, the processor may be a combination of processors implementing a computing function, for example, a combination of one or more microprocessors, a combination of a DSP and a microprocessor, or the like. The communications unit 903 may be a communications interface, a transceiver, a transceiver circuit, or the like. The communications interface is a collective term, and may include one or more interfaces such as transceiver interfaces. The storage unit 901 may be a memory.

Figure 10:
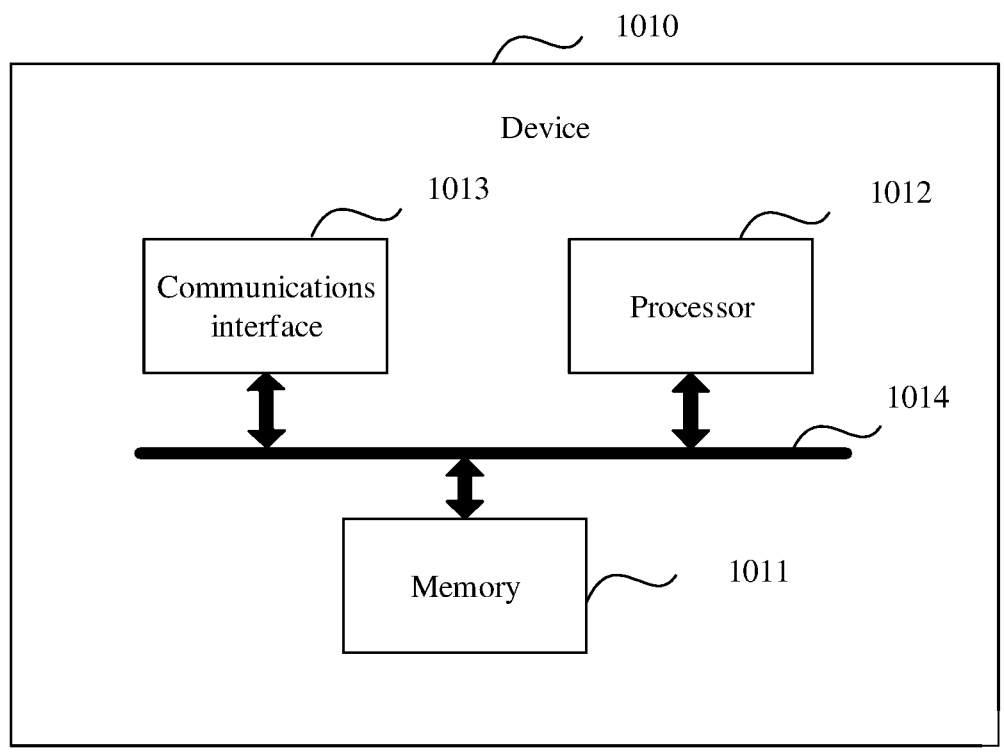
FIG. 10 is a schematic diagram of another embodiment of a motion vector prediction device according to an embodiment of this application.

When the processing unit 902 is a processor, the communications unit 903 is a communications interface, and the storage unit 901 is a memory, the device in this embodiment of this application may be a device shown in FIG. 10.

Referring to FIG. 10, the device 1010 includes a processor 1012, a communications interface 1013, and a memory 1011. Optionally, the device 1010 may further include a bus 1014. The communications interface 1013, the processor 1012, and the memory 1011 may be connected to each other using the bus 1014. The bus 1014 may be a peripheral component interconnect (PCI) bus, an extended industry standard architecture (EISA) bus, or the like. The bus 1014 may be classified into an address bus, a data bus, a control bus, and the like. For ease of representation, only one bold line is used for representation in FIG. 10. However, this does not mean that there is only one bus or only one type of bus.

Figure 11:
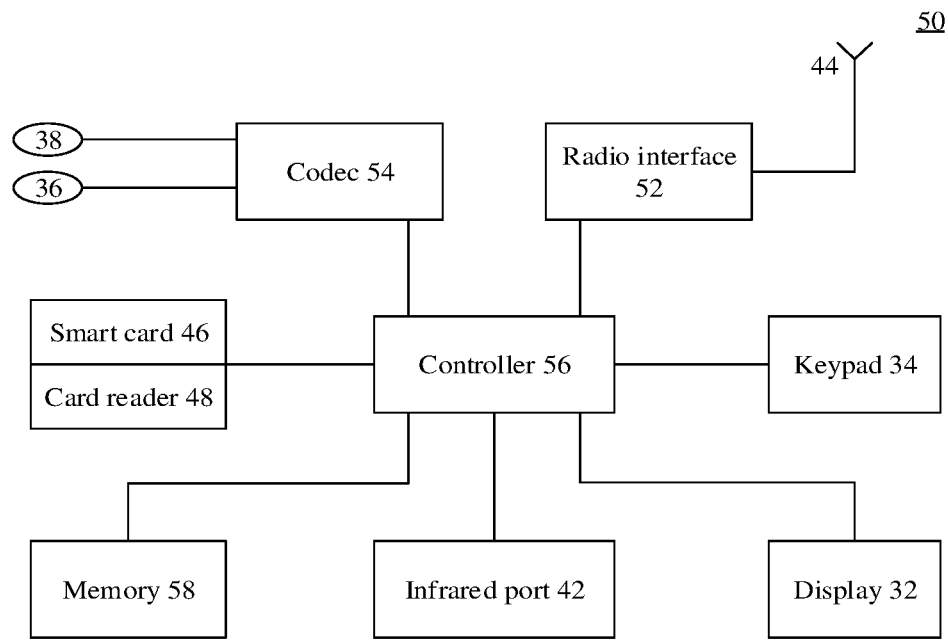
FIG. 11 is a schematic block diagram of a codec apparatus according to an embodiment of this application.
Figure 12:
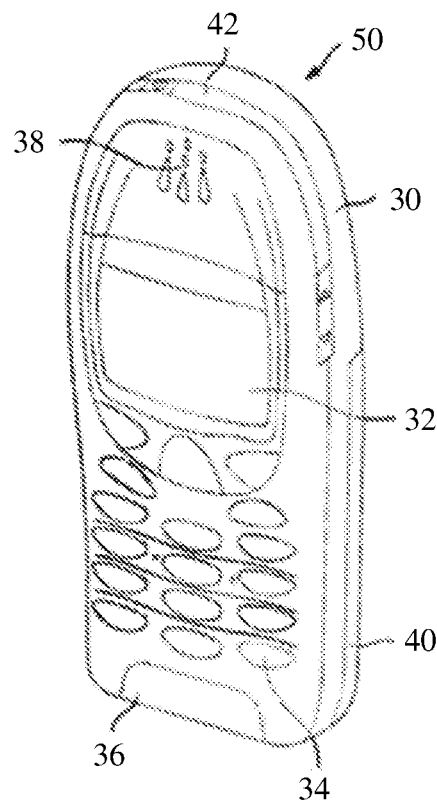
FIG. 12 is a schematic diagram of a codec apparatus according to an embodiment of this application.

In a feasible implementation, FIG. 11 and FIG. 12 show a codec apparatus 50 according to an embodiment of this application. The codec apparatus 50 may be a mobile terminal or user equipment in a wireless communications system. It should be understood that this embodiment of this application may be implemented in any electronic device or apparatus that may need to code and/or decode a video picture.

The codec apparatus 50 may include a housing 30 that is used to incorporate and protect the codec apparatus 50, a display 32 (which may be a liquid crystal display), and a keypad 34. The codec apparatus 50 may include a microphone 36 or any appropriate audio input, and the audio input may be digital or analog signal input. The codec apparatus 50 may further include the following audio output device, and in this embodiment of this application, the audio output device may be any one of an earphone 38, a loudspeaker, an analog audio output connection, or a digital audio output connection. The codec apparatus 50 may also include a battery 40. In another embodiment of this application, the codec apparatus 50 may be powered by any appropriate mobile energy device such as a solar cell, a fuel cell, or a clock mechanism generator. The codec apparatus 50 may further include an infrared port 42 used for short-range line-of-sight communication with another device. In another embodiment, the codec apparatus 50 may further include any appropriate short-range communication solution such as a Bluetooth wireless connection or a universal serial bus (USB) wired connection.

The codec apparatus 50 may include a controller 56 or a processor configured to control the codec apparatus 50. The controller 56 may be connected to a memory 58. In this embodiment of this application, the memory may store data that is in a form of a picture and data that is in a form of audio, and/or may store an instruction to be implemented by the controller 56. The controller 56 may be further connected to a codec 54 that is suitable for implementing audio and/or video data coding and decoding, or for aided coding and decoding that are implemented by the controller 56.

The codec apparatus 50 may further include a card reader 48 and a smart card 46 that are configured to provide user information and that are suitable for providing authentication information used to perform authentication and authorization on a user in a network, for example, a universal integrated circuit card (UICC) and a UICC reader.

The codec apparatus 50 may further include a radio interface circuit 52. The radio interface circuit is connected to the controller and is suitable for generating, for example, a wireless communication signal used for communication with a cellular communications network, a wireless communications system, or a wireless local area network. The codec apparatus 50 may further include an antenna 44. The antenna is connected to the radio interface circuit 52, and is configured to send, to another apparatus (or a plurality of apparatuses), a radio frequency signal generated in the radio interface circuit 52, and receive a radio frequency signal from the other apparatus (or the plurality of apparatuses).

In some embodiments of this application, the codec apparatus 50 includes a camera that can record or detect single frames, and the codec 54 or the controller receives and processes these single frames. In some embodiments of this application, the codec apparatus 50 may receive to-be-processed video picture data from another device before transmission and/or storage. In some embodiments of this application, the codec apparatus 50 may receive, through a wireless or wired connection, a picture to be coded/decoded.

All or some of the foregoing embodiments may be implemented using software, hardware, firmware, or any combination thereof. When the software is used to implement the embodiments, the embodiments may be implemented completely or partially in a form of a computer program product.

The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable device. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive), or the like.

It may be clearly understood by persons skilled in the art that, for ease of convenient and brief description, for a detailed working process of the foregoing system, device, and unit, refer to a corresponding process in the foregoing method embodiments. Details are not described herein.

In the embodiments provided in this application, it should be understood that the disclosed system, device, and method may be implemented in other manners. For example, the described device embodiment is merely an example. For example, the unit division is merely logical function division. There may be another division manner in an embodiment. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the devices or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve an objective of a solution in the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to other approaches, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this application. The storage medium includes any medium that can store program code, for example, a USB flash drive, a removable hard disk, a read-only memory (ROM), a random access memory (RAM), a magnetic disk, or a compact disc.

In conclusion, the foregoing embodiments are merely intended to describe the technical solutions of this application, but not to limit this application. Although this application is described in detail with reference to the foregoing embodiments, persons of ordinary skill in the art should understand that they may still make modifications to the technical solutions recorded in the foregoing embodiments or make equivalent replacements to some technical features thereof, without departing from the spirit and scope of the technical solutions of the embodiments of this application.

What is claimed is:

1. A motion vector prediction method, comprising:
obtaining a reference frame that corresponds to a first motion vector of a current block;
determining a first motion vector type of the first motion vector based on a reference frame type of the reference frame, wherein the reference frame type comprises a short-term reference frame or a long-term reference frame, wherein the first motion vector type comprises a short-term motion vector or a long-term motion vector, wherein the short-term motion vector is from the short-term reference frame, and wherein the long-term motion vector is from the long-term reference frame;
obtaining a second motion vector type of a second motion vector of a spatially adjacent prediction block of the current block when the spatially adjacent prediction block is an inter-frame prediction block, wherein the second motion vector is used for inter-frame prediction on the spatially adjacent prediction block;
determining a third motion vector of a spatially adjacent pixel block of the current block based on decoding information of the spatially adjacent pixel block when the second motion vector type is different from all motion vector types of all motion vectors of the current block, wherein the spatially adjacent pixel block comprises the spatially adjacent prediction block, and wherein the decoding information of the spatially adjacent pixel block comprises another motion vector of the spatially adjacent prediction block; and
using either the third motion vector or a scaling value of the third motion vector as a candidate motion vector predictor (MVP) of the current block when the second motion vector type is different from all the motion vector types of all the motion vectors of the current block, and setting the third motion vector as the other motion vector of the spatially adjacent prediction block at a left preset location, wherein the second motion vector of the spatially adjacent prediction block at the left preset location relative to the current block has a different motion vector type from the first motion vector of the current block, and wherein the other motion vector of the spatially adjacent prediction block at the left preset location is available.

2. The motion vector prediction method of claim 1, further comprising using the second motion vector as the candidate MVP of the current block, wherein the second motion vector type is the same as the first motion vector type.

3. The motion vector prediction method of claim 1, further comprising:
determining, in a virtual reference frame of the spatially adjacent prediction block, a virtual reference block having a slightest pixel difference from the spatially adjacent prediction block, wherein all spatially adjacent prediction blocks of the current block are intra-frame prediction blocks; and
using a motion vector between the virtual reference block and the spatially adjacent prediction block as a MVP of the current block when all of the spatially adjacent prediction blocks of the current block are the intra-frame prediction blocks, wherein a second reference frame type of the virtual reference frame is the same as the reference frame type of the reference frame corresponding to the first motion vector of the current block, and wherein the virtual reference frame is a reconstructed frame.

4. The motion vector prediction method of claim 1, wherein the spatially adjacent pixel block comprises at least one pixel block that is spatially adjacent to the current block and that is within a preset range, wherein the decoding information comprises a pixel reconstruction value of the spatially adjacent pixel block that is spatially adjacent to the current block and that is within the preset range, and wherein determining the third motion vector of the spatially adjacent pixel block comprises:
determining, in a first reference frame of the spatially adjacent pixel block, a first reference block having a pixel difference from the spatially adjacent pixel block;
using a fourth motion vector between the first reference block and the spatially adjacent pixel block as the third motion vector, wherein a second reference frame type of the first reference frame is the same as the reference frame type of the reference frame that corresponds to the first motion vector of the current block; and using the third motion vector or the scaling value of the third motion vector as the candidate MVP of the current block.

5. The motion vector prediction method of claim 4, further comprising:
determining, in the first reference frame of the spatially adjacent pixel block, the first reference block having the slightest pixel difference from the spatially adjacent pixel block, wherein the second motion vector at a left preset location relative to the current block has a different motion vector type from the first motion vector, and wherein the second motion vector at an upper preset location relative to the current block has the different motion vector type from the first motion vector;
using the fourth motion vector between the first reference block and the spatially adjacent pixel block as the third motion vector, wherein the second reference frame type of the first reference frame is the same as the reference frame type of the reference frame that corresponds to the first motion vector of the current block; and
using the third motion vector or the scaling value of the third motion vector as the candidate MVP of the current block.

6. The motion vector prediction method of claim 1, wherein a third motion vector type of the other motion vector of the spatially adjacent prediction block is different from the first motion vector type, and wherein the motion vector prediction method further comprises using the other motion vector of the spatially adjacent prediction block or another scaling value of the other motion vector of the spatially adjacent prediction block as the candidate MVP of the current block.

7. The motion vector prediction method of claim 6, further comprising
using the other motion vector of the spatially adjacent prediction block at an upper preset location as the candidate MVP of the current block or the other scaling value of the other motion vector of the spatially adjacent prediction block at the upper preset location as the candidate MVP of the current block, wherein the second motion vector of the spatially adjacent prediction block at the upper preset location relative to the current block has the different motion vector type from the first motion vector of the current block, and the other motion vector of the spatially adjacent prediction block at the upper preset location is available.

8. The motion vector prediction method of claim 6, wherein using the other motion vector of the spatially adjacent prediction block as the candidate MVP of the current block or the other scaling value of the other motion vector of the spatially adjacent prediction block as the candidate MVP of the current block comprises:
using the other motion vector of the spatially adjacent prediction block at a left preset location as the candidate MVP of the current block or the other scaling value of the other motion vector of the spatially adjacent prediction block as the candidate MVP of the current block, wherein the second motion vector of the spatially adjacent prediction block at the left preset location relative to the current block has a different motion vector type from the first motion vector of the current block, and the second motion vector of the spatially adjacent prediction block at an upper preset location relative to the current block has the different motion vector type from the first motion vector of the current block, and wherein the other motion vector of the spatially adjacent prediction block at the left preset location relative to the current block is available; or
using the other motion vector of the spatially adjacent prediction block at the upper preset location or the other scaling value of the other motion vector of the spatially adjacent prediction block as the candidate MVP of the current block, wherein the other motion vector of the spatially adjacent prediction block at the upper preset location relative to the current block is available.

9. The motion vector prediction method of claim 1, further comprising performing motion vector prediction in a coding method for the current block or a decoding method for the current block.

10. A motion vector prediction apparatus, comprising:
a processor; and
a memory coupled to the processor and storing instructions that, when executed by the processor, cause the motion vector prediction apparatus to be configured to:
obtain a reference frame corresponding to a first motion vector of a current block;
determine a first motion vector type of the first motion vector of the current block based on a reference frame type of the reference frame, wherein the reference frame type comprises a short-term reference frame or a long-term reference frame, wherein the first motion vector type comprises a short-term motion vector or a long-term motion vector, wherein the short-term motion vector is from the short-term reference frame, and wherein the long-term motion vector is from the long-term reference frame;
obtain a second motion vector type of a second motion vector of a spatially adjacent prediction block of the current block when the spatially adjacent prediction block is an inter-frame prediction block, wherein the second motion vector is used for inter-frame prediction on the spatially adjacent prediction block;
determine a third motion vector of a spatially adjacent pixel block of the current block based on decoding information of the spatially adjacent pixel block when the second motion vector type is different from all motion vector types of all motion vectors of the current block, wherein the spatially adjacent pixel block comprises the spatially adjacent prediction block, and wherein the decoding information of the spatially adjacent pixel block comprises another motion vector of the spatially adjacent prediction block; and
use either the third motion vector as a candidate motion vector predictor (MVP) of the current block or a scaling value of the third motion vector as the candidate MVP of the current block when the second motion vector type of the second motion vector is different from all the motion vector types of all the motion vectors of the current block, and setting the third motion vector as the other motion vector of the spatially adjacent prediction block at a left preset location, wherein the second motion vector of the spatially adjacent prediction block at the left preset location relative to the current block has a different motion vector type from the first motion vector of the current block, and wherein the other motion vector of the spatially adjacent prediction block at the left preset location is available.

11. The motion vector prediction apparatus of claim 10, wherein the instructions further cause the motion vector prediction apparatus to be configured to use the second motion vector as the candidate MVP of the current block, and wherein the second motion vector type is the same as the first motion vector type.

12. The motion vector prediction apparatus of claim 10, wherein the instructions further cause the motion vector prediction apparatus to be configured to:
  determine, in a virtual reference frame of the spatially adjacent prediction block, a virtual reference block having a pixel difference from the spatially adjacent prediction block, wherein the current block comprises spatially adjacent pixel blocks, and wherein all spatially adjacent prediction blocks of the current block are intra-frame prediction blocks; and
  use a motion vector between the virtual reference block and the spatially adjacent prediction block as a MVP of the current block, wherein all of the spatially adjacent prediction blocks of the current block are the intra-frame prediction blocks, wherein a second reference frame type of the virtual reference frame is the same as the reference frame type of the reference frame corresponding to the first motion vector of the current block, and wherein the virtual reference frame is a reconstructed frame.

13. The motion vector prediction apparatus of claim 10, wherein the spatially adjacent pixel block comprises at least one pixel block that is spatially adjacent to the current block and that is within a preset range, wherein the decoding information of the spatially adjacent pixel block comprises a pixel reconstruction value of the spatially adjacent pixel block that is spatially adjacent to the current block and that is within the preset range, and wherein the instructions further cause the motion vector prediction apparatus to be configured to:
  determine, in a first reference frame of the spatially adjacent pixel block, a first reference block having a pixel difference from the spatially adjacent pixel block;
  use a fourth motion vector between the first reference block and the spatially adjacent pixel block as the third motion vector, wherein a second reference frame type of the first reference frame is the same as the reference frame type of the reference frame that corresponds to the first motion vector of the current block; and
  use the third motion vector or the scaling value of the third motion vector as the candidate MVP of the current block.

14. The motion vector prediction apparatus of claim 13, wherein the instructions further cause the motion vector prediction apparatus to be configured to:
  determine, in the first reference frame of the spatially adjacent pixel block, the first reference block having the slightest pixel difference from the spatially adjacent pixel block, wherein the second motion vector at a left preset location relative to the current block has a different motion vector type from the first motion vector, and wherein the second motion vector at an upper preset location relative to the current block has the different motion vector type from the first motion vector type of the first motion vector;
  use the fourth motion vector between the first reference block and the spatially adjacent pixel block as the third motion vector, wherein the second reference frame type of the first reference frame is the same as the reference frame type of the reference frame that corresponds to the first motion vector of the current block; and
  use the third motion vector or the scaling value of the third motion vector as the candidate MVP of the current block.

15. The motion vector prediction apparatus of claim 10, wherein a third motion vector type of the other motion vector of the spatially adjacent prediction block of the current block is different from the first motion vector type, and wherein the instructions further cause the motion vector prediction apparatus to be configured to use the second motion vector of the spatially adjacent prediction block or another scaling value of the other motion vector of the spatially adjacent prediction block as the candidate MVP of the current block.

16. The motion vector prediction apparatus of claim 15, wherein the instructions further cause the motion vector prediction apparatus to be configured to
  use the other motion vector of the spatially adjacent prediction block at an upper preset location as the candidate MVP of the current block or the other scaling value of the other motion vector of the spatially adjacent prediction block at the upper preset location as the candidate MVP of the current block, wherein the second motion vector of the spatially adjacent prediction block at the upper preset location relative to the current block has the different motion vector type from the first motion vector of the current block, and wherein the other motion vector of the spatially adjacent prediction block at the upper preset location is available.

17. The motion vector prediction apparatus of claim 15, wherein the instructions further cause the motion vector prediction apparatus to be configured to:
  use the other motion vector of the spatially adjacent prediction block at a left preset location as the candidate MVP of the current block or the other scaling value of the other motion vector of the spatially adjacent prediction block as the candidate MVP of the current block, wherein the second motion vector of the spatially adjacent prediction block at the left preset location relative to the current block has a different motion vector type from the first motion vector of the current block, and the second motion vector of the spatially adjacent prediction block at an upper preset location relative to the current block has the different motion vector type from the first motion vector of the current block, and wherein the other motion vector of the spatially adjacent prediction block at the left preset location relative to the current block is available; or
  use the other motion vector of the spatially adjacent prediction block at the upper preset location or the other scaling value of the other motion vector of the spatially adjacent prediction block as the candidate MVP of the current block, wherein the other motion vector of the spatially adjacent prediction block at the upper preset location relative to the current block is available.

18. The motion vector prediction apparatus of claim 10, wherein the instructions further cause the motion vector prediction apparatus to be configured to perform motion vector prediction in an encoder for coding the current block or in a decoder for decoding the current block.

19. The motion vector prediction apparatus of claim 10, wherein the instructions further cause the motion vector prediction apparatus to be configured to obtain the reference frame corresponding to the first motion vector of the current block based on index information.

20. The motion vector prediction method of claim 1, further comprising obtaining the reference frame corresponding to the first motion vector of the current block based on index information.

* * * * *